(12) United States Patent
Ravilisetty et al.

(10) Patent No.: US 9,033,531 B2
(45) Date of Patent: May 19, 2015

(54) LED-BASED ILLUMINATION MODULES WITH THIN COLOR CONVERTING LAYERS

(71) Applicant: Xicato, Inc., San Jose, CA (US)

(72) Inventors: Padmanabha Rao Ravilisetty, Cupertino, CA (US); Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 212 days.

(21) Appl. No.: 13/867,840

(22) Filed: Apr. 22, 2013

(65) Prior Publication Data

US 2013/0235556 A1    Sep. 12, 2013

Related U.S. Application Data

(63) Continuation of application No. 13/328,974, filed on Dec. 16, 2011, now Pat. No. 8,425,065.

(60) Provisional application No. 61/428,691, filed on Dec. 30, 2010.

(51) Int. Cl.
*F21V 9/16*     (2006.01)
*C09K 11/08*     (2006.01)
(Continued)

(52) U.S. Cl.
CPC ............... *F21V 9/16* (2013.01); *C09K 11/0883* (2013.01); *C09K 11/7734* (2013.01);
(Continued)

(58) Field of Classification Search
CPC ......... F21V 9/16; F21V 3/0481; F21V 13/08; F21V 3/04; C09K 11/02
USPC ................... 362/84, 230, 235, 249.02, 260
See application file for complete search history.

(56) References Cited

U.S. PATENT DOCUMENTS 4,883,970 A * 11/1989 Page ....................... 250/483.1
5,731,658 A     3/1998 Lengyel et al.
(Continued)

FOREIGN PATENT DOCUMENTS

EP     1 126 497 A1    8/2001
EP     1 947 670 A2    7/2008
(Continued)

OTHER PUBLICATIONS

International Search Report and Written Opinion mailed on May 25, 2012 for PCT Application No. PCT/US2011/066270 filed on Dec. 20, 2011, 18 pages.
(Continued)

*Primary Examiner* — David V Bruce
(74) *Attorney, Agent, or Firm* — Silicon Valley Patent Group LLP

(57) ABSTRACT

An illumination module includes a plurality of Light Emitting Diodes (LEDs). The illumination module may include a reflective color converting element with a PTFE layer and a color converting layer fixed to the PTFE layer. The color converting layer includes phosphor particles embedded in a polymer matrix and has a thickness that is less than five times an average diameter of the phosphor particles. The illumination module may include a transmissive color converting element. The color converting elements may be produced by mixing a polymer binder with a solvent and phosphor particles to form a homogeneous suspension of the phosphor particles. The homogeneous suspension is applied to a surface to form an uncured color converting layer, which is heated to vaporize the solvent. The cured color converting layer includes the phosphor particles suspended in the polymer binder.

20 Claims, 15 Drawing Sheets

(51) Int. Cl.

| | | |
|---|---|---|
| *C09K 11/77* | (2006.01) | |
| *F21K 99/00* | (2010.01) | |
| *F21V 3/04* | (2006.01) | |
| *F21V 5/04* | (2006.01) | |
| *F21V 7/22* | (2006.01) | |
| *F21V 13/04* | (2006.01) | |
| *C09K 11/02* | (2006.01) | |
| *F21V 13/08* | (2006.01) | |
| *F21V 29/00* | (2006.01) | |
| *F21Y 101/02* | (2006.01) | |
| *F21Y 105/00* | (2006.01) | |
| *F21V 13/12* | (2006.01) | |

(52) U.S. Cl.
CPC ............... *C09K 11/7774* (2013.01); *F21K 9/13* (2013.01); *F21K 9/56* (2013.01); *F21K 9/90* (2013.01); *F21V 3/04* (2013.01); *F21V 5/04* (2013.01); *F21V 7/22* (2013.01); *F21V 13/04* (2013.01); *F21V 29/2206* (2013.01); *F21Y 2101/02* (2013.01); *F21Y 2105/001* (2013.01); *C09K 11/02* (2013.01); *F21V 13/08* (2013.01); *F21V 13/12* (2013.01); *F21V 3/0481* (2013.01)

(56) References Cited

U.S. PATENT DOCUMENTS

| | | | |
|---|---|---|---|
| 5,952,036 | A | 9/1999 | Tadaki et al. |
| 5,959,316 | A | 9/1999 | Lowery |
| 5,980,347 | A | 11/1999 | Udagawa et al. |
| 6,351,069 | B1 | 2/2002 | Lowery et al. |
| 6,504,301 | B1 | 1/2003 | Lowery |
| 6,586,882 | B1 | 7/2003 | Harbers |
| 6,600,175 | B1 | 7/2003 | Baretz et al. |
| 6,660,184 | B2 | 12/2003 | Singh et al. |
| 6,680,569 | B2 | 1/2004 | Mueller-Mach et al. |
| 6,812,500 | B2 | 11/2004 | Reeh et al. |
| 7,126,162 | B2 | 10/2006 | Reeh et al. |
| 7,215,077 | B2 | 5/2007 | Kawamura et al. |
| 7,250,715 | B2 | 7/2007 | Mueller et al. |
| 7,410,599 | B2 | 8/2008 | Ravilisetty |
| 7,479,662 | B2 | 1/2009 | Soules et al. |
| 7,501,763 | B2 | 3/2009 | Hashimoto et al. |
| 7,518,232 | B2 | 4/2009 | Yoo |
| 7,564,180 | B2 | 7/2009 | Brandes |
| 7,614,759 | B2 | 11/2009 | Negley |
| 7,629,621 | B2 | 12/2009 | Reeh et al. |
| 8,425,065 | B2 | 4/2013 | Ravillisetty et al. |
| 2004/0066307 | A1 | 4/2004 | Lin et al. |
| 2007/0081336 | A1 | 4/2007 | Bierhuizen et al. |
| 2008/0310158 | A1 | 12/2008 | Harbers et al. |
| 2009/0103293 | A1 | 4/2009 | Harbers et al. |
| 2009/0103296 | A1 | 4/2009 | Harbers et al. |
| 2009/0128032 | A1 | 5/2009 | Kim |
| 2009/0141474 | A1 | 6/2009 | Kolodin |
| 2009/0166653 | A1 | 7/2009 | Weaver, Jr. et al. |
| 2009/0224651 | A1 | 9/2009 | Lee et al. |
| 2010/0033948 | A1 | 2/2010 | Harbers et al. |
| 2010/0090583 | A1 | 4/2010 | Bae et al. |
| 2010/0141113 | A1 | 6/2010 | Okuyama et al. |
| 2010/0156290 | A1 | 6/2010 | Kim et al. |
| 2010/0203792 | A1 | 8/2010 | Kigami et al. |

FOREIGN PATENT DOCUMENTS

| | | |
|---|---|---|
| EP | 2 065 348 A2 | 6/2009 |
| EP | 2 204 836 A1 | 7/2010 |
| WO | WO 98/49706 A1 | 11/1998 |
| WO | WO 2009/125314 A2 | 10/2009 |
| WO | WO 2009/146261 A1 | 12/2009 |
| WO | WO 2012/033709 A1 | 3/2012 |

OTHER PUBLICATIONS

Cho, C-Y. et al. (Feb. 15, 2009). "A tailored design for dispersion stabilization of a dispersant-free $BaMgAl_{10}O_{17}:Eu^{2+}$ (BAM) paste based on the acid/base properties of the particle surface," *Materials Chemistry and Physics* vol. 113, Issues 2-3, pp. 909-912.

Jung, I.Y. et al. (Nov. 2005). "Optical properties of the $BaMgAl_{10}O_{17}:Eu^{2+}$ phosphor coated with $SiO_2$ for a plasma display panel," *Applied Physics Letters* vol. 87, Issue 19, pp. 19108-191908-3.

Lee, Sangkyu et al. (Dec. 2007). "Luminescent properties of $BaMgAl_{10}O_{17}:Eu^{2+}$ phosphor layer prepared with phosphate ester," *Journals of Materials Research* vol. 22, No. 12, pp. 3309-3315.

Rao, R.P. (2007). "Phosphors for Plasma Display Panels," Chapter 10, Sec.5 in *Phosphor Handbook* ($2^{nd}$ Ed.) CRC Press, pp. 745-768.

Sohn, S.H. et al. (Oct. 2002). "Optical properties of the neodymium-containing transparent dielectrics for plasma display panel," *Applied Physics Letters* vol. 81, Issue 17, pp. 3179-3181.

Song, J-Y. et al. (Jul. 2006). "Fabrication and characterization of Pb-free transparent dielectric layer for plasma display panel," *Displays* vol. 27, Issue 3, pp. 112-116.

Uchidoi, M. (Apr. 2006). "Critical aspects of the plasma display panel manufacturing process," *IEEE Transactions on Plasma Science* vol. 34, No. 2, pp. 287-293.

Zuo, Shu et al. (Apr. 15, 2010). "Field Emission Properties of the Dendritic Carbon Nanotubes Film Embedded with ZnO Quantum Dots," *Journal of Nanomaterials*, Hindawi Publishing Corporation. vol. 2011, Article ID 382068, 5 pages.

Notice of Allowance mailed on Dec. 28, 2012 by Examiner Bruce for U.S. Appl. No. 13/328,974, filed Dec. 16, 2011 by Xicato, Inc., 11 pages.

\* cited by examiner

LED-BASED ILLUMINATION MODULES WITH THIN COLOR CONVERTING LAYERS

CROSS REFERENCE TO RELATED APPLICATIONS

This application is a continuation of U.S. application Ser. No. 13/328,974, filed Dec. 16, 2011, which, in turn, claims priority under 35 USC 119 to U.S. Provisional Application No. 61/428,691, filed Dec. 30, 2010, both of which are incorporated by reference herein in their entireties.

TECHNICAL FIELD

The described embodiments relate to illumination modules that include Light Emitting Diodes (LEDs).

BACKGROUND

The use of light emitting diodes in general lighting is still limited due to limitations in light output level or flux generated by the illumination devices. Illumination devices that use LEDs also typically suffer from poor color quality characterized by color point instability. The color point instability varies over time as well as from part to part. Poor color quality is also characterized by poor color rendering, which is due to the spectrum produced by the LED light sources having bands with no or little power. Further, illumination devices that use LEDs typically have spatial and/or angular variations in the color. Additionally, illumination devices that use LEDs are expensive due to, among other things, the necessity of required color control electronics and/or sensors to maintain the color point of the light source or using only a small selection of produced LEDs that meet the color and/or flux requirements for the application.

Consequently, improvements to illumination device that uses light emitting diodes as the light source are desired.

SUMMARY

An illumination module includes a plurality of Light Emitting Diodes (LEDs). The illumination module may include a reflective color converting element with a PTFE layer and a color converting layer fixed to the PTFE layer. The color converting layer includes phosphor particles embedded in a polymer matrix and has a thickness that is less than five times an average diameter of the phosphor particles. The illumination module may include a transmissive color converting element. The color converting elements may be produced by mixing a polymer binder with a solvent and phosphor particles to form a homogeneous suspension of the phosphor particles. The homogeneous suspension is applied to a surface to form an uncured color converting layer, which is heated to vaporize the solvent. The cured color converting layer includes the phosphor particles suspended in the polymer binder In an embodiment, an apparatus includes a light source sub-assembly having a plurality of Light Emitting Diodes (LEDs); and a reflective color converting element comprising a polytetrafluoroethylene (PTFE) layer and a first color converting layer fixed to the PTFE layer, wherein the first color converting layer includes a plurality of phosphor particles of a first type embedded in a polymer matrix, and wherein a thickness of the first color converting layer is less than five times an average diameter of the phosphor particles.

In an embodiment, an apparatus includes a light source sub-assembly having a plurality of Light Emitting Diodes (LEDs); a reflective color converting element comprising a polytetrafluoroethylene (PTFE) layer and a first color converting layer fixed to the PTFE layer, wherein the first color converting layer includes a plurality of phosphor particles of a first type embedded in a polymer matrix, and wherein a thickness of the first color converting layer is less than five times an average diameter of the phosphor particles; and a transmissive color converting element comprising an optically transparent layer and a second color converting layer fixed to the optically transparent layer, wherein the second color converting layer includes a plurality of second phosphor particles, wherein the second phosphor particles have a peak emission wavelength of no more than 600 nanometers.

In an embodiment, an apparatus includes a plurality of Light Emitting Diodes (LEDs); a transmissive color converting assembly positioned to receive a light emitted from the plurality of LEDs, the transmissive color converting assembly comprising: a first transmissive optical element; a second transmissive optical element; a first color converting material disposed between the first transmissive optical element and the second transmissive optical element; and a sealing material disposed between the first transmissive optical element and the second transmissive optical element that fixedly couples the first transmissive optical element to the second transmissive optical element, wherein the first color converting material is contained by the first transmissive optical element and the second transmissive optical element and the sealing material.

In an embodiment, a method includes mixing a polymer binder with a solvent and a plurality of phosphor particles to form a homogeneous suspension of the phosphor particles; applying the homogeneous suspension to a surface to form an uncured color converting layer; and heating the uncured color converting layer to vaporize the solvent to form a cured color converting layer, wherein the cured color converting layer includes the phosphor particles suspended in the polymer binder, and wherein a thickness of the cured color converting layer is less than five times an average diameter of the phosphor particles.

Further details and embodiments and techniques are described in the detailed description below. This summary does not define the invention. The invention is defined by the claims.

DETAILED DESCRIPTION

Reference will now be made in detail to background examples and some embodiments of the invention, examples of which are illustrated in the accompanying drawings.

Figure 1:
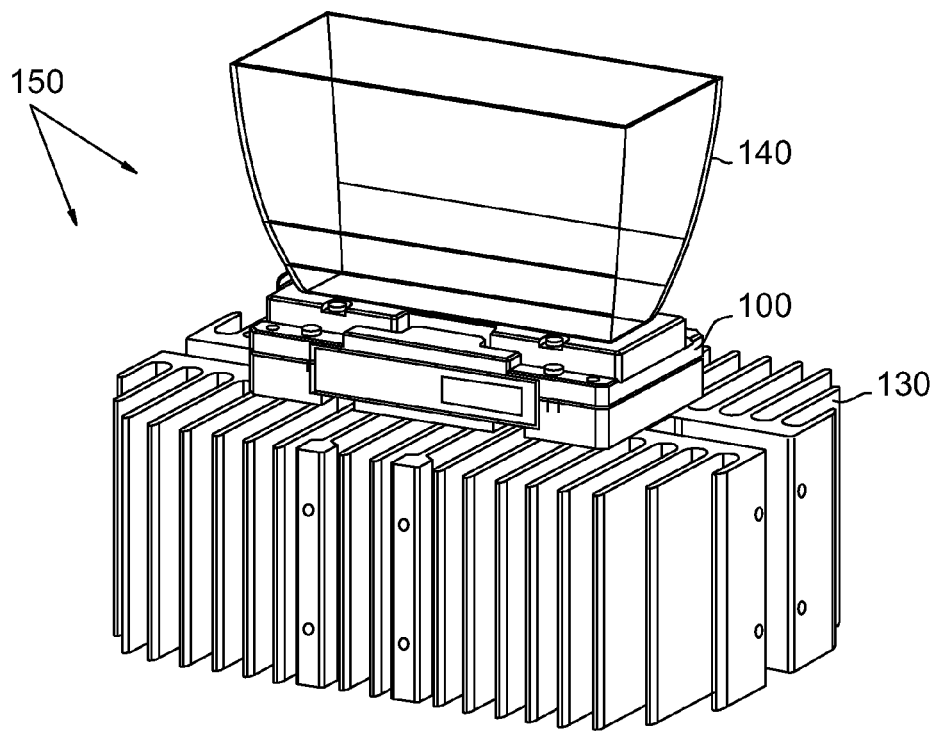
FIGS. 1, 2, and 3 illustrate three exemplary luminaires, including an illumination device, reflector, and light fixture.
Figure 2:
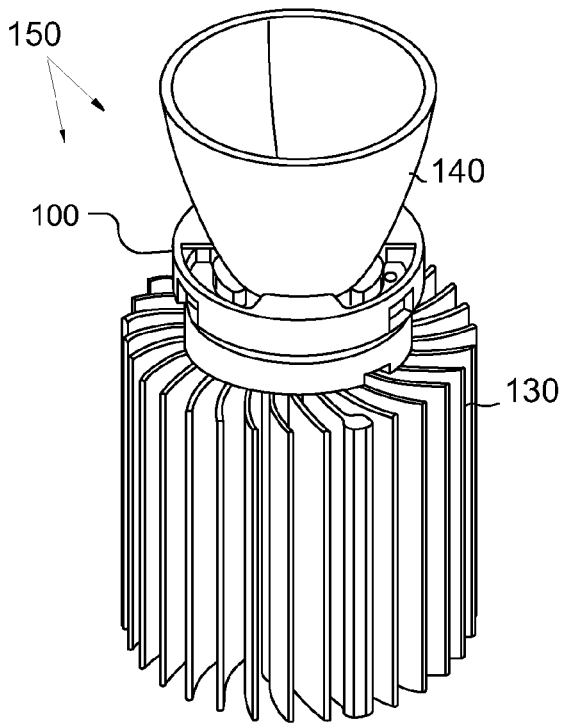
Figure 3:
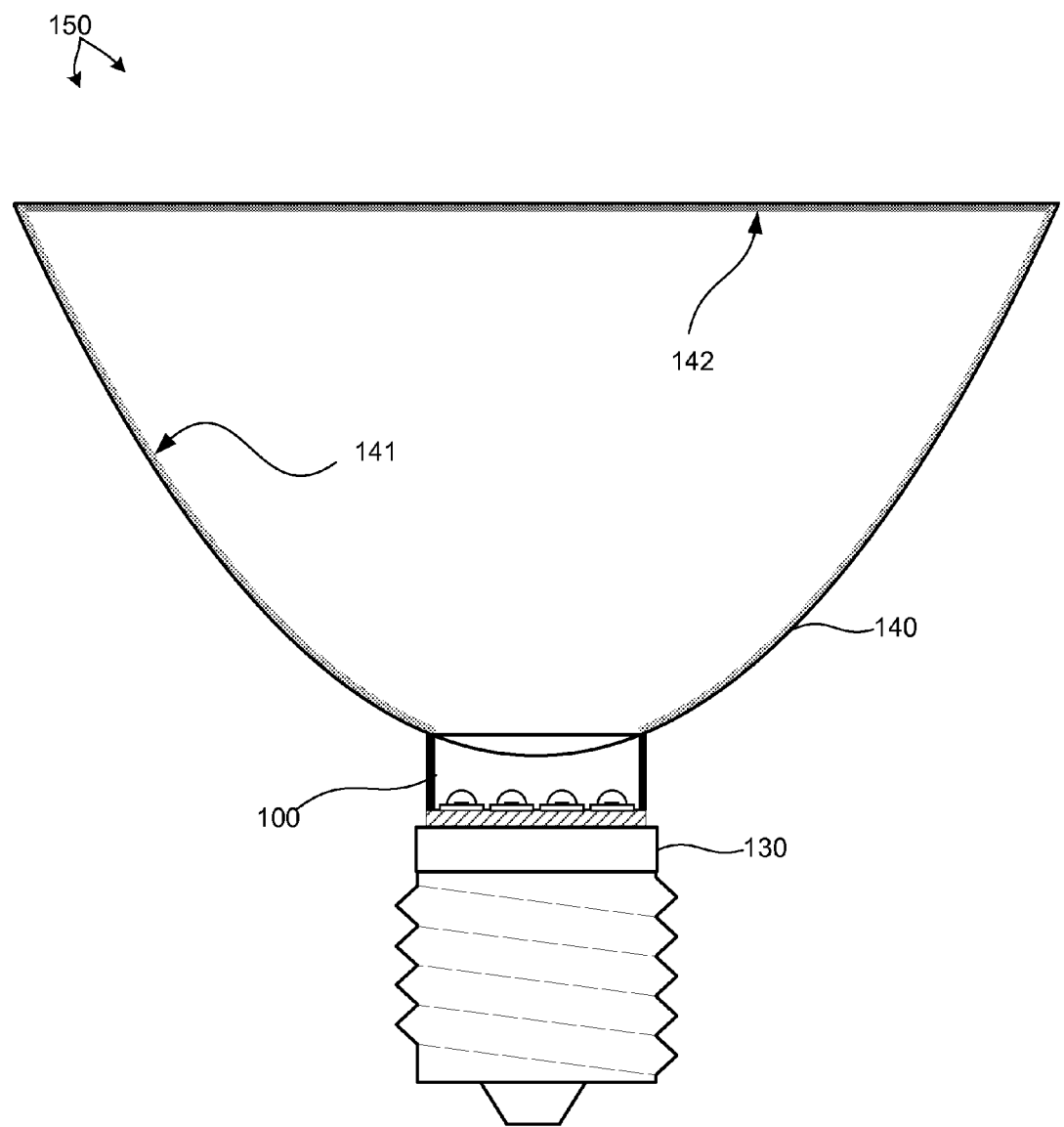

FIGS. 1, 2, and 3 illustrate three exemplary luminaires, all labeled 150. The luminaire illustrated in FIG. 1 includes an illumination module 100 with a rectangular form factor. The luminaire illustrated in FIG. 2 includes an illumination module 100 with a circular form factor. The luminaire illustrated in FIG. 3 includes an illumination module 100 integrated into a retrofit lamp device. These examples are for illustrative purposes. Examples of illumination modules of general polygonal and elliptical shapes may also be contemplated. Luminaire 150 includes illumination module 100, reflector 140, and light fixture 130. As depicted, light fixture 130 includes a heat sink capability. However, light fixture 130 may include other structural and decorative elements (not shown). Reflector 140 is mounted to illumination module 100 to collimate or deflect light emitted from illumination module 100. The reflector 140 may be made from a thermally conductive material, such as a material that includes aluminum or copper and may be thermally coupled to illumination module 100. Heat flows by conduction through illumination module 100 and the thermally conductive reflector 140. Heat also flows via thermal convection over the reflector 140. Reflector 140 may be a compound parabolic concentrator, where the concentrator is constructed of or coated with a highly reflecting material. Optical elements, such as a diffuser or reflector 140 may be removably coupled to illumination module 100, e.g., by means of threads, a clamp, a twist-lock mechanism, or other appropriate arrangement. As illustrated in FIG. 3, the reflector 140 may include sidewalls 141 and a window 142 that are optionally coated, e.g., with a wavelength converting material, diffusing material or any other desired material.

As depicted in FIGS. 1, 2, and 3, illumination module 100 is mounted to heat sink 130. Heat sink 130 may be made from a thermally conductive material, such as a material that includes aluminum or copper and may be thermally coupled to illumination module 100. Heat flows by conduction through illumination module 100 and the thermally conductive heat sink 130. Heat also flows via thermal convection over heat sink 130. Illumination module 100 may be attached to heat sink 130 by way of screw threads to clamp the illumination module 100 to the heat sink 130. To facilitate easy removal and replacement of illumination module 100, illumination module 100 may be removably coupled to heat sink 130, e.g., by means of a clamp mechanism, a twist-lock mechanism, or other appropriate arrangement. Illumination module 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module 100.

Figure 4:
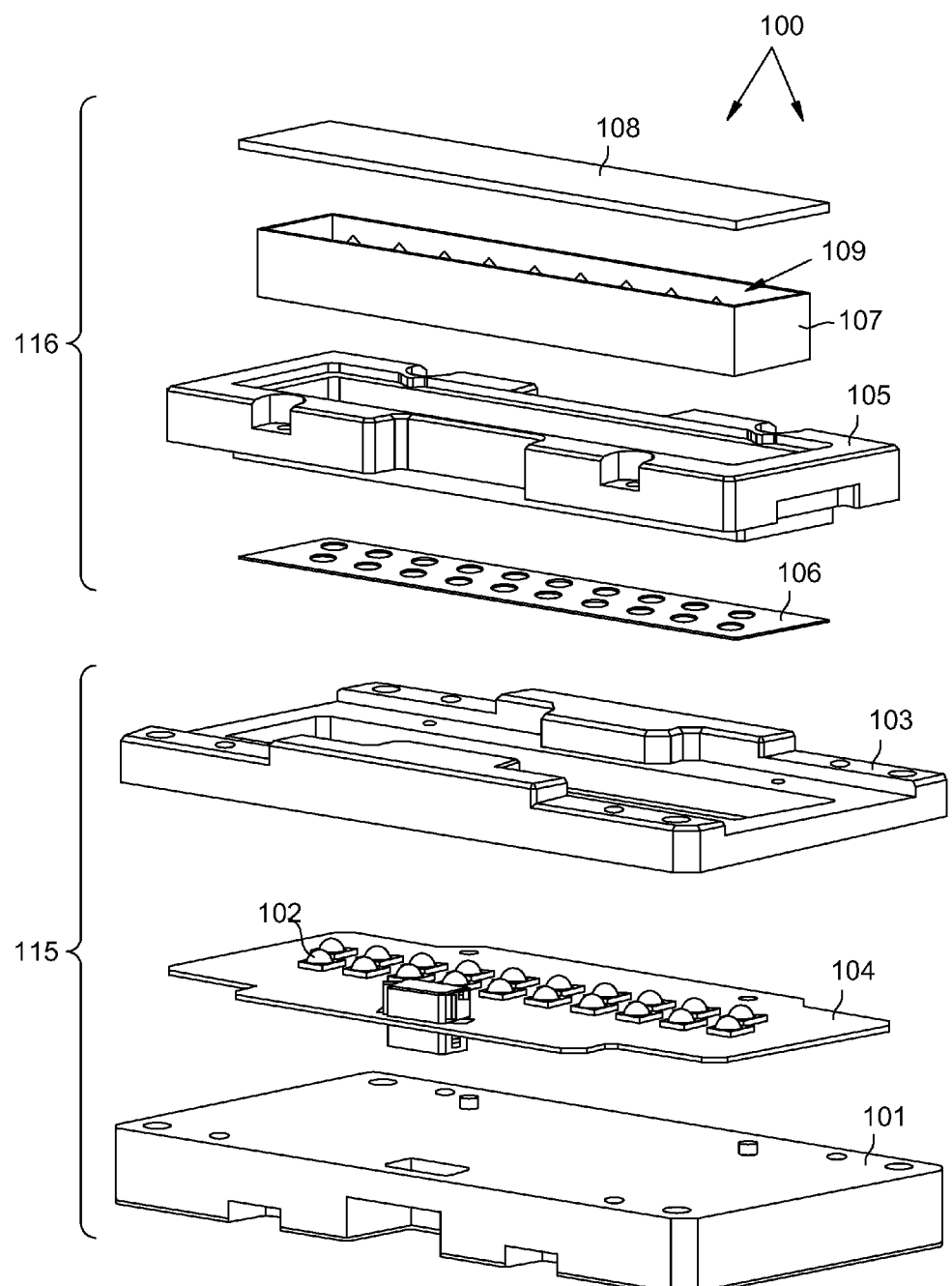
FIG. 4 shows an exploded view illustrating components of LED based illumination device as depicted in FIG. 1.

FIG. 4 illustrates an exploded view of components of LED based illumination module 100 as depicted in FIG. 1 by way of example. It should be understood that as defined herein an LED based illumination module is not an LED, but is an LED light source or fixture or component part of an LED light source or fixture. For example, an LED based illumination module may be an LED based replacement lamp such as depicted in FIG. 3. LED based illumination module 100 includes one or more LED die or packaged LEDs and a mounting board to which LED die or packaged LEDs are attached. In one embodiment, the LEDs 102 are packaged LEDs, such as the Luxeon Rebel manufactured by Philips Lumileds Lighting. Other types of packaged LEDs may also be used, such as those manufactured by OSRAM (Oslon package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LED chip typically has a size about 1 mm by 1 mm by 0.5 mm, but these dimensions may vary. In some embodiments, the LEDs 102 may include multiple chips. The multiple chips can emit light of similar or different colors, e.g., red, green, and blue. Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and an output port, which is illustrated as, but is not limited to, an output window 108. Light conversion sub-assembly 116 optionally includes either or both bottom reflector insert 106 and sidewall insert 107. Output window 108, if used as the output port, is fixed to the top of cavity body 105. In some embodiments, output window 108 may be fixed to cavity body 105 by an adhesive. To promote heat dissipation from the output window to cavity body 105, a thermally conductive adhesive is desirable. The adhesive should reliably withstand the temperature present at the interface of the output window 108 and cavity body 105. Furthermore, it is preferable that the adhesive either reflect or transmit as much incident light as possible, rather than absorbing light emitted from output window 108. In one example, the combination of heat tolerance, thermal conductivity, and optical properties of one of several adhesives manufactured by Dow Corning (USA) (e.g., Dow Corning model number SE4420, SE4422, SE4486, 1-4173, or SE9210), provides suitable performance. However, other thermally conductive adhesives may also be considered.

Either the interior sidewalls of cavity body 105 or sidewall insert 107, when optionally placed inside cavity body 105, is reflective so that light from LEDs 102, as well as any wavelength converted light, is reflected within the cavity 109 until it is transmitted through the output port, e.g., output window 108 when mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination module 100, other shapes may be contemplated (e.g., clover shaped or polygonal). In addition, the interior sidewalls of cavity body 105 may taper or curve outward from mounting board 104 to output window 108, rather than perpendicular to output window 108 as depicted.

Bottom reflector insert 106 and sidewall insert 107 may be highly reflective so that light reflecting downward in the cavity 109 is reflected back generally towards the output port, e.g., output window 108. Additionally, inserts 106 and 107 may have a high thermal conductivity, such that it acts as an additional heat spreader. By way of example, the inserts 106 and 107 may be made with a highly thermally conductive material, such as an aluminum based material that is processed to make the material highly reflective and durable. By way of example, a material referred to as Miro®, manufactured by Alanod, a German company, may be used. High reflectivity may be achieved by polishing the aluminum, or by covering the inside surface of inserts 106 and 107 with one or more reflective coatings. Inserts 106 and 107 might alternatively be made from a highly reflective thin material, such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan). In other examples, inserts 106 and 107 may be made from a polytetrafluoroethylene (PTFE) material. In some examples inserts 106 and 107 may be made from a PTFE material of one to two millimeters thick, as sold by W.L. Gore (USA) and Berghof (Germany). In yet other embodiments, inserts 106 and 107 may be constructed from a PTFE material backed by a thin reflective layer such as a metallic layer or a non-metallic layer such as ESR, E60L, or MCPET. Also, highly diffuse reflective coatings can be applied to any of sidewall insert 107, bottom reflector insert 106, output window 108, cavity body 105, and mounting board 104. Such coatings may include titanium dioxide (TiO2), zinc oxide (ZnO), and barium sulfate (BaSO4) particles, or a combination of these materials.

Figure 5A:
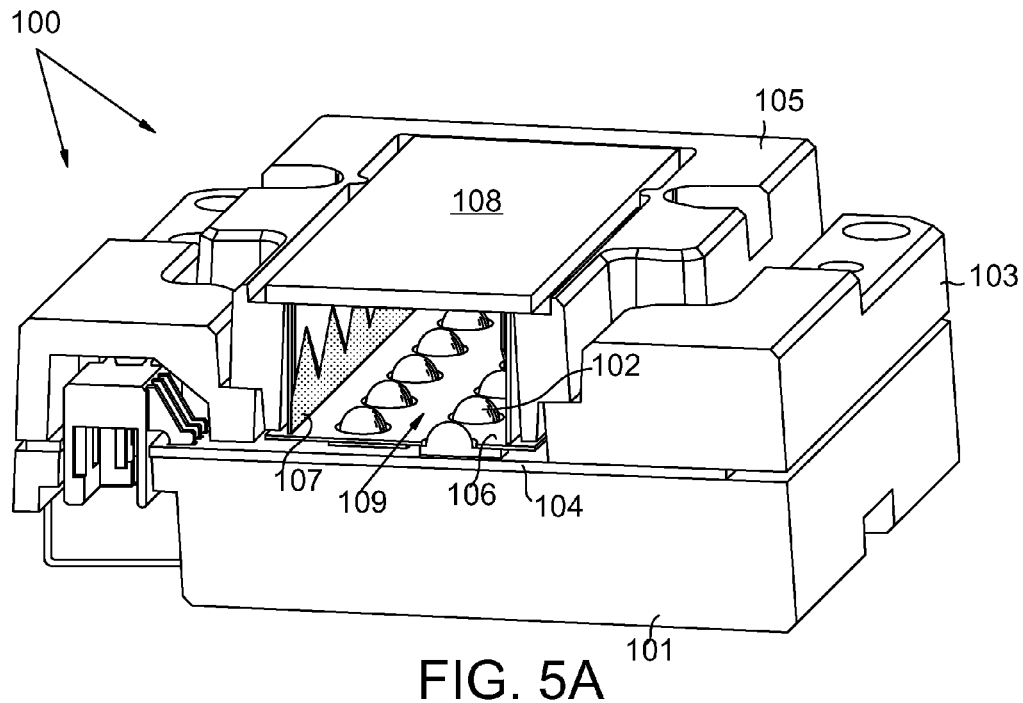
FIGS. 5A and 5B illustrates a perspective, cross-sectional view of LED based illumination device as depicted in FIG. 1.
Figure 5B:
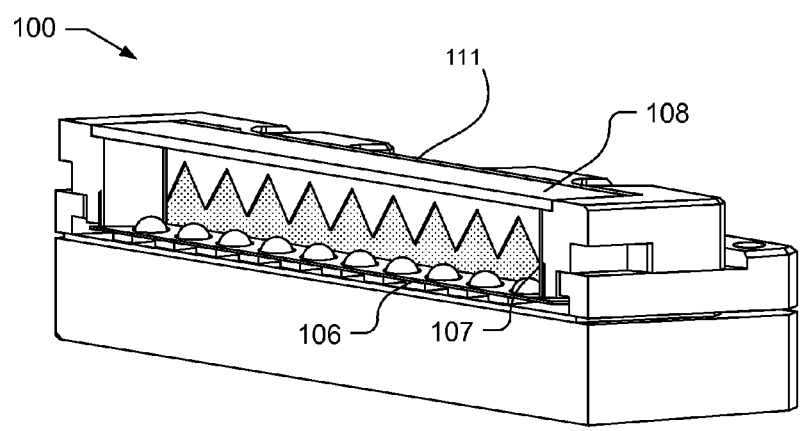

FIGS. 5A and 5B illustrate perspective, cross-sectional views of LED based illumination module 100 as depicted in FIG. 1. In this embodiment, the sidewall insert 107, output window 108, and bottom reflector insert 106 disposed on mounting board 104 define a light mixing cavity 109 (illustrated in FIG. 5A) in the LED based illumination module 100. A portion of light from the LEDs 102 is reflected within light mixing cavity 109 until it exits through output window 108. Reflecting the light within the cavity 109 prior to exiting the output window 108 has the effect of mixing the light and providing a more uniform distribution of the light that is emitted from the LED based illumination module 100.

The LEDs 102 can emit different or the same colors, either by direct emission or by phosphor conversion, e.g., where phosphor layers are applied to the LEDs as part of the LED package. Thus, the illumination device 100 may use any combination of colored LEDs 102, such as red, green, blue, amber, or cyan, or the LEDs 102 may all produce the same color light or some or all may produce white light. For example, the LEDs 102 may all emit either blue or UV light. In addition, the LEDs 102 may emit polarized light or non-polarized light and LED based illumination device 100 may use any combination of polarized or non-polarized LEDs. When used in combination with phosphors (or other wavelength conversion means), which may be, e.g., in or on the output window 108, applied in or on the sidewalls of cavity body 105 such as in or on sidewall insert 107, applied in or on bottom reflector 106, or applied to other components placed inside the cavity (not shown), such that the output light of the illumination device 100 has the color as desired. The photo converting properties of the wavelength converting materials in combination with the mixing of light within cavity 109 results in the output port, e.g., output window 108, emitting color converted light. By tuning the chemical and/or physical (such as thickness and concentration) properties of the wavelength converting materials and the geometric properties of the coatings on the interior surfaces of cavity 109, specific color properties of light output by output window 108 may be specified, e.g., color point, color temperature, and color rendering index (CRI).

Portions of cavity 109, such as the bottom reflector insert 106, sidewall insert 107, and cavity body 105, may be coated with a wavelength converting material. FIG. 5B illustrates portions of the sidewall insert 107 coated with a wavelength converting material. Furthermore, portions of output window 108 may be coated with the same or a different wavelength converting material. In addition, portions of bottom reflector insert 106 may be coated with the same or a different wavelength converting material. In another example (not shown), sidewall insert 107 is omitted and the interior facing walls of cavity body 105 may be coated with a wavelength converting material.

By way of example, the phosphors may be chosen from the set denoted by the following chemical formulas: $Y_3Al_5O_{12}$:Ce, (also known as YAG:Ce, or simply YAG) $(Y,Gd)_3Al_5O_{12}$:Ce, CaS:Eu, SrS:Eu, $SrGa_2S_4$:Eu, $Ca_3(Sc,Mg)_2Si_3O_{12}$:Ce, $Ca_3Sc_2Si_3O_{12}$:Ce, $Ca_3Sc_2O_4$:Ce, $Ba_3Si_6O_{12}N_2$:Eu, (Sr,Ca)$AlSiN_3$:Eu, $CaAlSiN_3$:Eu, $CaAlSi(ON)_3$:Eu, $Ba_2SiO_4$:Eu, $Sr_2SiO_4$:Eu, $Ca_2SiO_4$:Eu, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Ga_5O_{12}$:Ce, $Gd_3Ga_5O_{12}$:Ce, $Tb_3Al_5O_{12}$:Ce, $Tb_3Ga_5O_{12}$:Ce, and $Lu_3Ga_5O_{12}$:Ce. In one example, the adjustment of color point of the illumination device may be accomplished by replacing sidewall insert 107 and/or the output window 108, which similarly may be coated or impregnated with one or more wavelength converting materials. In one embodiment a red emitting phosphor such as a europium activated alkaline earth silicon nitride (e.g., $(Sr,Ca)AlSiN_3:Eu$) covers a portion of sidewall insert 107 and bottom reflector insert 106 at the bottom of the cavity 109, and a YAG phosphor covers a portion of the output window 108. In another embodiment, a red emitting phosphor such as alkaline earth oxy silicon nitride covers a portion of sidewall insert 107 and bottom reflector insert 106 at the bottom of the cavity 109, and a blend of a red emitting alkaline earth oxy silicon nitride and a yellow emitting YAG phosphor covers a portion of the output window 108. In some embodiments, the phosphors are mixed in a suitable solvent medium with a binder and, optionally, a surfactant and a plasticizer. The resulting mixture is deposited by any of spraying, screen printing, blade coating, or other suitable means. By choosing the shape and height of the sidewalls that define the cavity, and selecting which of the parts in the cavity will be covered with phosphor or not, and by optimization of the layer thickness and concentration of the phosphor layer on the surfaces of light mixing cavity 109, the color point of the light emitted from the module can be tuned as desired.

In one example, a single type of wavelength converting material may be patterned on the sidewall, which may be, e.g., the sidewall insert 107 shown in FIG. 5B. By way of example, a red phosphor may be patterned on different areas of the sidewall insert 107 and a yellow phosphor may cover the output window 108. The coverage and/or concentrations of the phosphors may be varied to produce different color temperatures. It should be understood that the coverage area of the red and/or the concentrations of the red and yellow phosphors will need to vary for different illumination modules 100 in order for the different illumination modules 100 to produce the same desired color temperatures if the blue light produced by the LEDs 102 in the different illumination modules 100 varies. The color performance of the LEDs 102, red phosphor on the sidewall insert 107 and the yellow phosphor on the output window 108 may be measured before assembly and selected based on performance so that the assembled pieces produce the desired color temperature.

In many applications it is desirable to generate white light output with a correlated color temperature (CCT) less than 4,200 degrees Kelvin, such as less than 3,100 degrees Kelvin. For example, in many applications, white light with a CCT of 2,700 degrees Kelvin is desired. Some amount of red emission is generally required to convert light generated from LEDs emitting in the blue or UV portions of the spectrum to a white light output with a CCT less than 4,200 degrees Kelvin. Efforts are being made to blend yellow phosphor with red emitting phosphors such as $CaS:Eu$, $SrS:Eu$, $SrGa_2S_4:Eu$, $Ba_3Si_6O_{12}N_2:Eu$, $(Sr,Ca)AlSiN_3:Eu$, $CaAlSiN_3:Eu$, $CaAlSi(ON)_3:Eu$, $Ba_2SiO_4:Eu$, $Sr_2SiO_4:Eu$, $Ca_2SiO_4:Eu$, $CaSi_2O_2N_2:Eu$, $SrSi_2O_2N_2:Eu$, $BaSi_2O_2N_2:Eu$, $Sr_8Mg(SiO_4)_4Cl_2:Eu$, $Li_2NbF_7:Mn^{4+}$, $Li_3ScF_6:Mn^{4+}$, $La_2O_2S:Eu^{3+}$ and $MgO.MgF_2.GeO_2:Mn^{4+}$ to reach the required CCT. However, color consistency of the output light is typically poor due to the sensitivity of the CCT of the output light to the red phosphor component in the blend. Poor color distribution is more noticeable in the case of blended phosphors, particularly in lighting applications. By coating output window 108 with a phosphor or phosphor blend that does not include any red emitting phosphor, problems with color consistency may be avoided. To generate white light output with a CCT less than 4,200 degrees Kelvin, a red emitting phosphor or phosphor blend is deposited on any of the sidewalls and bottom reflector of LED based illumination module 100. The specific red emitting phosphor or phosphor blend (e.g., peak wavelength emission from 600 nanometers to 700 nanometers) as well as the concentration of the red emitting phosphor or phosphor blend are selected to generate a white light output with a CCT less than 4,200 degrees Kelvin. In this manner, an LED based illumination module may generate white light with a CCT less than 4,200K with an output window that does not include a red emitting phosphor component.

In some embodiments, any of the bottom reflector 106, cavity body 105, output window 108, and sidewall insert 107 may be constructed from or include a PTFE material at an interior surface facing light mixing cavity 109. In one example, any of the output window 108, bottom reflector insert 106, sidewall insert 107, and cavity body 105 may be made from a PTFE material. In another example, any of the output window 108, bottom reflector insert 106, sidewall insert 107, and cavity body 105 may include a PTFE layer backed by a reflective layer such as a polished metallic layer. The PTFE material may be formed from sintered PTFE particles. In some embodiments, portions of any of the interior facing surfaces of any of the bottom reflector 106, cavity body 105, and sidewall insert 107 constructed from a PTFE material may be coated with a wavelength converting material. In other embodiments, a wavelength converting material may be mixed with the PTFE material. For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

In other embodiments, any of the bottom reflector 106, cavity body 105, and sidewall insert 107 may be constructed from or include a reflective, ceramic material, such as ceramic material produced by CerFlex International (The Netherlands), at an interior surface facing light mixing cavity 109. In one example, portions of any of the interior facing surfaces of any of the bottom reflector 106, cavity body 105, and sidewall insert 107 constructed from a ceramic material may be coated with a wavelength converting material.

In other embodiments, any of the bottom reflector 106, cavity body 105, and sidewall insert 107 may be constructed from or include a reflective, metallic material, such as aluminum or Miro® produced by Alanod (Germany), at an interior surface facing light mixing cavity 109. In one example, portions of any of the interior facing surfaces of any of the bottom reflector 106, cavity body 105, and sidewall insert 107 constructed from a reflective metallic material may be coated with a wavelength converting material.

In other embodiments, any of the bottom reflector 106, cavity body 105, and sidewall insert 107 may be constructed from or include a reflective, plastic material, such as MCPET at an interior surface facing light mixing cavity 109. In one example, portions of any of the interior facing surfaces of any of the bottom reflector 106, cavity body 105, and sidewall insert 107 constructed from a reflective plastic material may be coated with a wavelength converting material.

Cavity 109 may be filled with a non-solid material, such as air or an inert gas, so that the LEDs 102 emits light into the non-solid material. By way of example, the cavity may be hermetically sealed and Argon gas used to fill the cavity. Alternatively, Nitrogen may be used. In other embodiments, cavity 109 may be filled with a solid encapsulate material. By way of example, silicone may be used to fill the cavity.

The PTFE material is less reflective than other materials that may be used for the bottom reflector insert 106, sidewall insert 107 or cavity body 105, such as Miro® produced by Alanod. In one example, the blue light output of an LED based illumination module 100 constructed with uncoated Miro® sidewall insert 107 was compared to the same module constructed with an uncoated PTFE sidewall insert 107 constructed from sintered PTFE material manufactured by Berghof (Germany). Blue light output from module 100 was decreased 7% by use of a PTFE sidewall insert. Similarly, blue light output from module 100 was decreased 5% compared to uncoated Miro® sidewall insert 107 by use of an uncoated PTFE sidewall insert 107 constructed from sintered PTFE material manufactured by W.L. Gore (USA). Light extraction from the module 100 is directly related to the reflectivity inside the cavity 109, and thus, the inferior reflectivity of the PTFE material, compared to other available reflective materials, would lead away from using the PTFE material in the cavity 109. Nevertheless, the inventors have determined that when the PTFE material is coated with phosphor, the PTFE material unexpectedly produces an increase in luminous output compared to other more reflective materials, such as Miro®, with a similar phosphor coating. In another example, the white light output of an illumination module 100 targeting a correlated color temperature (CCT) of 4,000 degrees Kelvin constructed with phosphor coated Miro® sidewall insert 107 was compared to the same module constructed with a phosphor coated PTFE sidewall insert 107 constructed from sintered PTFE material manufactured by Berghof (Germany). White light output from module 100 was increased 7% by use of a phosphor coated PTFE sidewall insert compared to phosphor coated Miro®. Similarly, white light output from module 100 was increased 14% compared to phosphor coated Miro® sidewall insert 107 by use of a PTFE sidewall insert 107 constructed from sintered PTFE material manufactured by W.L. Gore (USA). In another example, the white light output of an illumination module 100 targeting a correlated color temperature (CCT) of 3,000 degrees Kelvin constructed with phosphor coated Miro® sidewall insert 107 was compared to the same module constructed with a phosphor coated PTFE sidewall insert 107 constructed from sintered PTFE material manufactured by Berghof (Germany). White light output from module 100 was increased 10% by use of a phosphor coated PTFE sidewall insert compared to phosphor coated Miro®. Similarly, white light output from module 100 was increased 12% compared to phosphor coated Miro® sidewall insert 107 by use of a PTFE sidewall insert 107 constructed from sintered PTFE material manufactured by W.L. Gore (USA).

Thus, it has been discovered that, despite being less reflective, it is desirable to construct phosphor covered portions of the light mixing cavity 109 from a PTFE material. Moreover, the inventors have also discovered that phosphor coated PTFE material has greater durability when exposed to the heat from LEDs, e.g., in a light mixing cavity 109, compared to other more reflective materials, such as Miro®, with a similar phosphor coating.

Although it may seem desirable to apply thick layers of phosphors (e.g., layer thickness greater than five times the average diameter of the phosphor particles) onto a substrate to form either a reflective or transmissive color converting element, the inventors have discovered that photons tend to become trapped in thick layers and efficiency is lost. In contrast, by utilizing thin layers packed to the appropriate density, a high percentage of incoming photons are either color converted or recovered in an unconverted state as useable light.

In one aspect phosphor may be applied in a thin layer to provide highly efficient color conversion in a reflective mode and in a transmissive mode. In a reflective mode, the thin layer is densely packed to maximize the amount of incident light that is color converted. In a transmissive mode, the thin layer is sparsely packed to allow a portion of the incident light to pass through unconverted. In one example, phosphor is deposited on a substrate to a thickness of less than five times the average diameter of the phosphor particles. In another example, phosphor is deposited on a substrate to a thickness of less than three times the average diameter of the phosphor particles. In yet another example, phosphor is deposited on a substrate in a single layer. In examples that provide color conversion in a transmissive mode, phosphor is deposited with a packing density less than 90%, such that a portion of light incident to the substrate is either reflected or transmitted without color conversion. In examples that provide color conversion in a reflective mode, phosphor is deposited with a packing density greater than 50%, such that substantially all light incident to the substrate is color converted. In another aspect, the aforementioned thin layers of phosphor are deposited on a PTFE substrate. It has been discovered that phosphor particles deposited onto a PTFE substrate in a thin layer generate highly efficient color conversion in an LED based illumination device.

Figure 6:
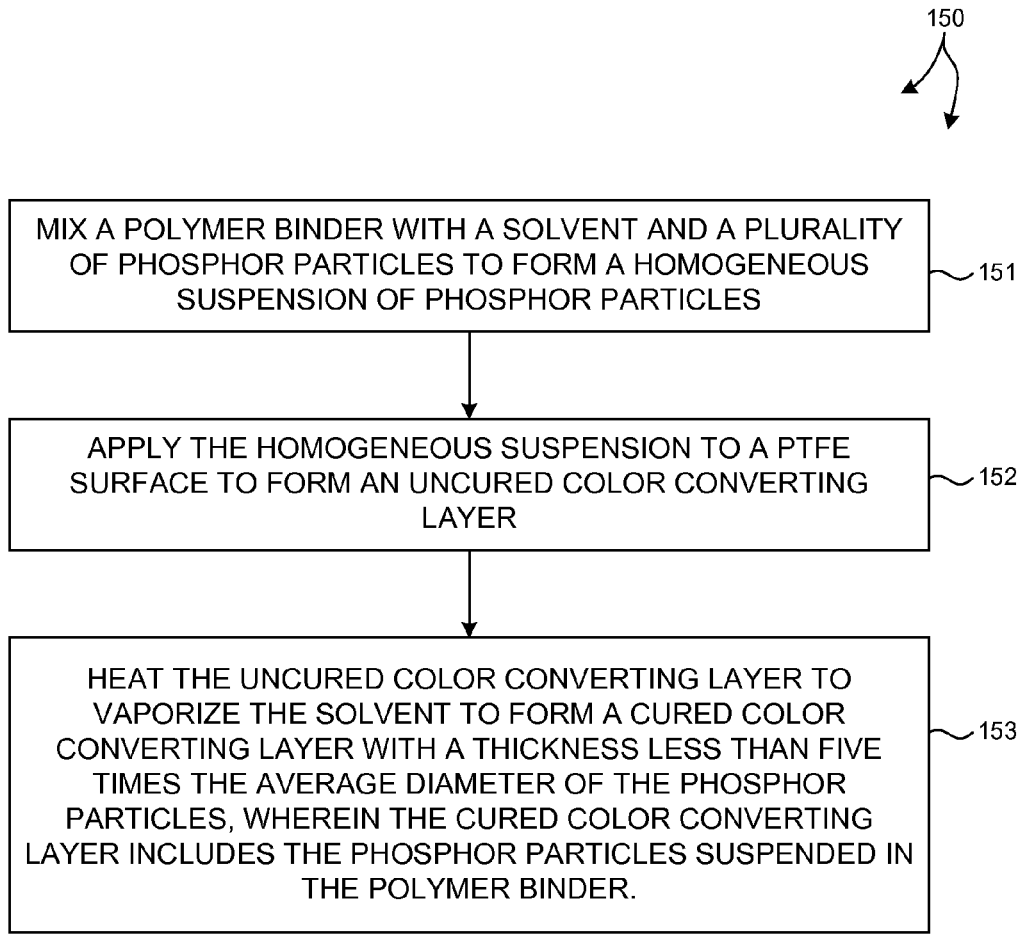
FIG. 6 is a flow chart illustrative of a method of applying a thin layer of phosphor onto a reflective substrate.

FIG. 6 is a flow chart illustrative of a method 150 of applying a thin layer of phosphor onto a reflective substrate. In the illustrated example of method 150, a low temperature process is employed to deposit a thin layer of phosphor particles on a PTFE substrate. In other examples, method 150 may be employed to deposit a thin layer of phosphor particles on other reflective surfaces (e.g., glass, aluminum, coated aluminum, ceramic, or plastic substrates). In the low temperature process a binder remains on the substrate with the phosphor particles as part of the final product, rather than being decomposed (typically by a high temperature curing step).

In block 151, a polymer binder (e.g., ethyl cellulose,) is mixed with a solvent (e.g., butoxyethyl acetate) and combined with a wavelength converting material (e.g., phosphor particles or blend of phosphor particles) to form a homogeneous phosphor suspension. In some examples, the average particle size of the phosphor particles may be between one and twenty five microns. Different polymer binders may be employed as part of method 150 (e.g., polyvinyl butyral, cellulose based binders, silicone based binders, and urethane based binders). Similarly, solvents selected for their compatibility with the selected binders (e.g., terpineol, isobutyl alcohol, butyl carbolite acetate, butyl cellulose, silicone solvents, and urethane solvents) may be employed as part of method 150. In some embodiments, in addition to the phosphor particles, a small amount (e.g., 0.1% to 5% by weight) of plasticizer (e.g., diisobutyl phthalate) may be added to facilitate adhesion of the phosphor particles to the substrate. In some embodiments, a surfactant (e.g., stearic acid, Polyethylene glycol (PEG)) may be added to the phosphor particles. For example, a small amount of surfactant (e.g., less than 5% by weight) may be added. The surfactant acts to keep the phosphor particles from clumping together and promotes the even distribution of phosphor particles in the suspension.

In different examples, the proportion of phosphor particles to reduced polymer binder may vary. In one example, phosphor particles may be mixed with the reduced polymer binder with solvent in a 50:50 proportion by weight. This proportion has been found useful to generate color converting layers with a packing density greater than 90% with a thickness less than five times the average diameter of the phosphor particles. In another example, the phosphor particles may be mixed with the reduced polymer binder in a proportion of 20:80. This proportion has been found useful to generate color converting layers with a packing density less than 95% with a thickness less than three times the average diameter of the phosphor particles.

In block 152, the homogeneous phosphor suspension is applied to a PTFE substrate to form an uncured color converting layer. The homogeneous phosphor suspension may be applied to the PTFE substrate by a number of methods. Examples of suitable methods include blade coating, screen printing, and spraying. The solvent may be mixed with the polymer binder in differing proportions depending on the desired viscosity. For example, for effective application to a substrate by blade coating or screen printing, solvent may be mixed with the polymer binder in a suitable proportion (e.g., between 5:1 and 10:1 by weight). For effective application to a substrate by spraying, solvent may be mixed with the polymer binder in a suitable proportion (e.g., between 10:1 and 20:1 by weight).

In some examples the homogeneous suspension may be applied to a surface by blade coating. The suspension is dispersed using a sapphire or stainless steel blade. An automatic film applicator maintains a constant distance between the blade and the surface. A stainless steel stencil may be employed to direct the application of the suspension to a specific portion of the surface (e.g., specific pattern or surface geometry).

In some examples, the homogeneous suspension may also be applied to a surface by screen printing. Screens may be customized to completely mask or partially mask various sizes and shapes. Open portions of the screen may include different aspect ratios to vary the concentration of the applied phosphor particles. For screen printing, custom made screens with mesh numbers from 150 to 300 have been found to be effective. Pre cut substrates (e.g., PTFE, Alanod, MCPET) are attached to an aluminum base under vacuum with a screen overlay. A homogeneous suspension of phosphor particles is dispersed using a suitable squeeze applicator (e.g., rubber applicator) at constant speed and pressure.

In block 153, the uncured color converting layer is heated to a temperature above the flash point of the solvent to vaporize the solvent to form a cured color converting layer with a thickness of less than five times the average diameter of the phosphor particles. For example, the uncured color converting layer is heated to a temperature of 80 to 150 degrees Centigrade for 30 to 300 minutes to vaporize the solvent. The process temperature remains below the temperature where the binder begins to decompose. Thus, the cured color converting layer includes a thin layer of phosphor particles suspended in the polymer binder. The polymer binder keeps the phosphor particles positioned with respect to one another in a stable manner. Furthermore, the low temperature process does not denature, or otherwise decompose or alter the chemical composition of the phosphors, thus their color conversion properties remain intact. This is particularly important for certain families of phosphors (e.g., nitridosilicates and oxy silicon nitrides). In addition, the low temperature process does not decompose, denature, or otherwise degrade the mechanical structure of the PTFE material, thereby maintaining its diffuse, reflective properties.

Phosphor particles of varying diameter may be effectively employed using method 150. The inventors have found the use of phosphor particles with an average diameter of 6-8 μm to be useful. However, phosphor particles with an average diameter between 1 μm and 25 μm may also be used beneficially.

Figure 7:
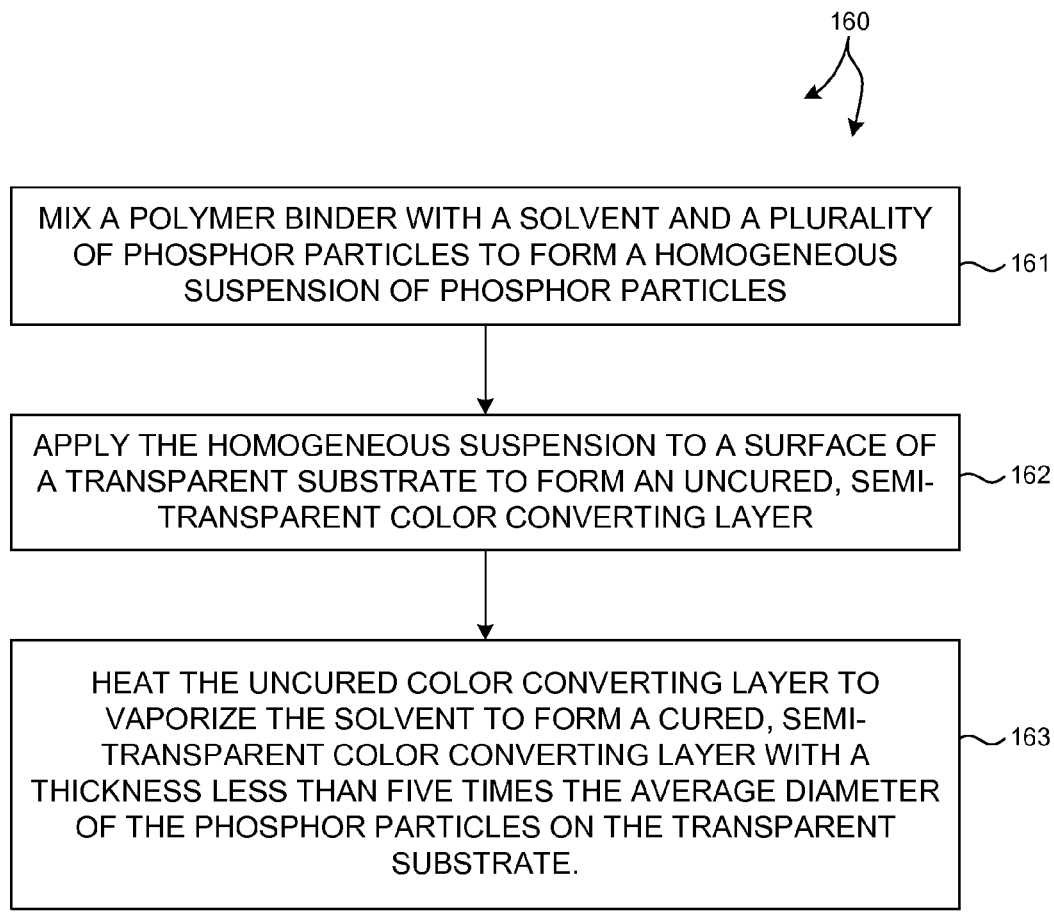
FIG. 7 is a flow chart illustrative of a method of applying a thin, semi-transparent color converting layer onto a transparent substrate.

FIG. 7 is a flow chart illustrative of a method 160 of applying a thin, semi-transparent color converting layer onto a transparent substrate (e.g., sapphire, alumina, glass, polycarbonate, plastic). In block 161, a polymer binder (e.g., ethylcellulose) is mixed with a solvent (e.g., butoxyethyl acetate) and combined with phosphor particles to form a homogeneous phosphor suspension. Different polymer binders may be employed as part of method 160 (e.g., polyvinyl butyral, cellulose based binders, silicone based binders, and urethane based binders). Similarly, solvents selected for their compatibility with the selected binders (e.g., terpineol, isobutyl alcohol, butyl carbolite acetate, butyl cellulose, silicone solvents, and urethane solvents) may be employed as part of method 160. In some embodiments, in addition to the phosphor particles, a plasticizer (e.g., diisobutyl phthalate) may be added to facilitate adhesion of the phosphor particles to the substrate. In some embodiments, a surfactant (e.g., stearic acid, PEG) may be added. The surfactant acts to keep the phosphor particles from clumping together and promotes the even distribution of phosphor particles in the suspension.

In different examples, the proportion of phosphor particles to reduced polymer binder may vary. In one example, phosphor particles may be mixed with the reduced polymer binder in a 95:5 proportion by weight. This proportion has been found useful to produce a semi-transparent color converting layer with a packing density less than 95% with a thickness less than three times the average diameter of the phosphor particles where at least 10% of incident light is transmitted through the layer without color conversion. In some examples less than 30% of incident light is transmitted through the layer without color conversion.

In block 162, the homogeneous phosphor suspension is applied to a transparent substrate to form an uncured, semi-transparent color converting layer as discussed with respect to method 150. The homogeneous phosphor suspension may be applied to the transparent substrate by a number of methods. Examples of suitable methods include blade coating, screen printing, and spraying. The solvent may be mixed with the polymer binder in differing proportions depending on the desired viscosity. For example, for effective application to a substrate by blade coating or screen printing, solvent may be mixed with the polymer binder in a suitable proportion (e.g., between 5:1 and 10:1 by weight). For effective application to a substrate by spraying, solvent may be mixed with the polymer binder in a suitable proportion (e.g., between 10:1 and 20:1 by weight).

In block 163, the uncured, semi-transparent color converting layer is heated to a temperature above the flash point of the solvent to vaporize the solvent to form a cured, semi-transparent color converting layer with a thickness of less than five times the average diameter of the phosphor particles.

In some examples, the process temperature remains below the temperature where the binder begins to decompose. In one example, the uncured, semi-transparent color converting layer is heated to a temperature of 100 to 120 degrees Centigrade for 30 to 60 minutes to vaporize the butoxyethyl acetate solvent. Thus, the cured, semi-transparent color converting layer includes a thin layer of phosphor particles suspended in the polymer binder. The polymer binder keeps the phosphor particles positioned with respect to one another in a stable manner. Furthermore, the low temperature process does not denature, or otherwise decompose or alter the chemical composition of the phosphors, thus their color conversion properties remain intact. This is particularly important for certain families of phosphors (e.g., nitridosilicates and oxy silicon nitrides).

In some examples, a process temperature is employed that causes the binder to decompose or otherwise denature. By removing the binder, its effect on the efficiency of light transmission through the cured, semi-transparent color converting layer is negated. A plasticizer that withstands the curing temperatures may be employed to adhere the phosphor particles to the substrate or maintain an even distribution of phosphor particles within the cured, semi-transparent color converting layer. In one example, a temperature of 360 degrees Centigrade may be employed to decompose an ethylcellulose binder and the butoxyethyl acetate solvent completely.

Phosphor particles of varying diameter may be effectively employed using method 160. The inventors have found the use of phosphor particles with an average diameter of 6-8 μm to be useful. However, phosphor particles with an average diameter between 1 μm and 25 μm may also be used beneficially.

Figure 8:
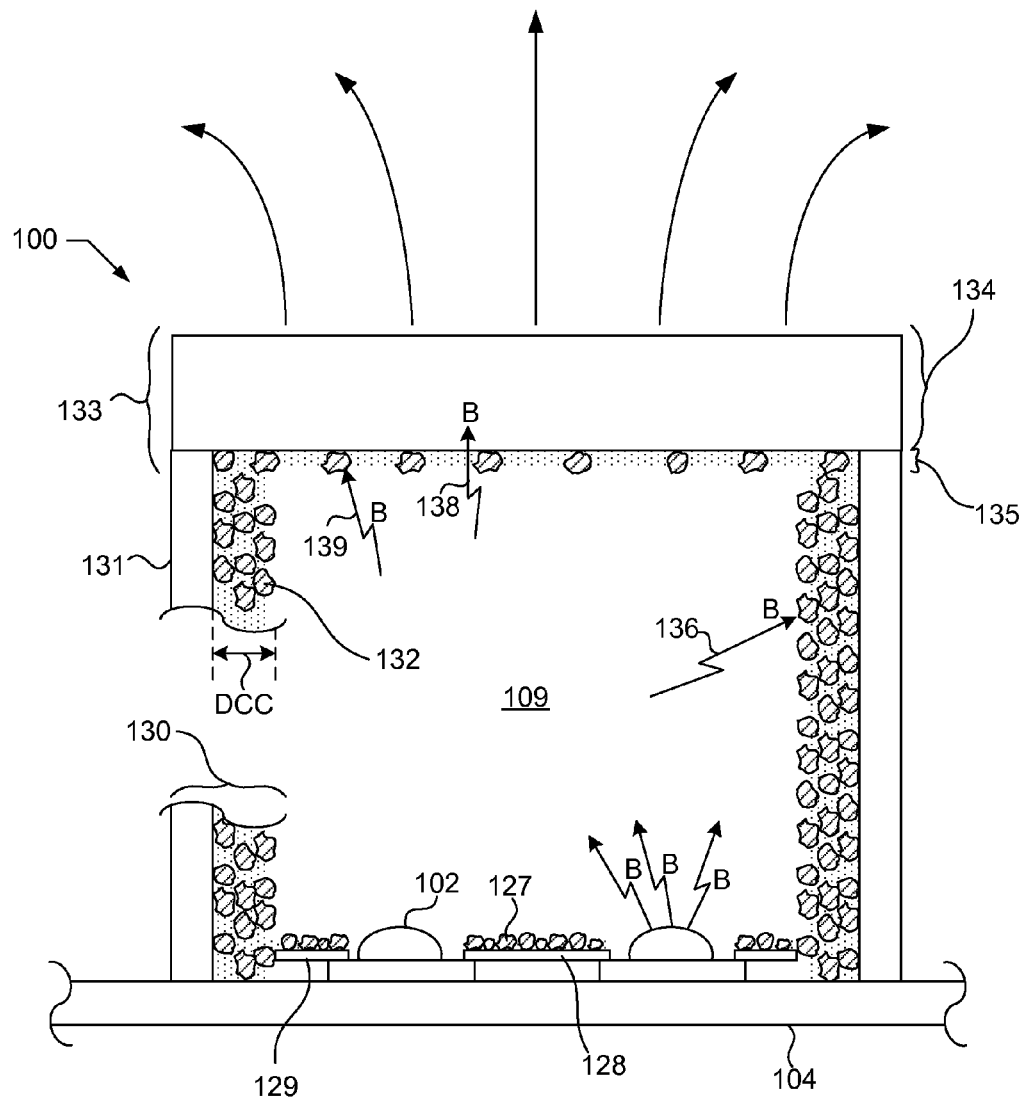
FIG. 8 is illustrative of a cross-sectional view of LED based illumination module that includes reflective and transmissive color converting elements coated with a thin layer of phosphor.

FIG. 8 is illustrative of a cross-sectional view of LED based illumination module 100 that includes reflective color converting elements 129 and 130 coated in accordance with method 150 and a transmissive color converting element 133 coated in accordance with method 160. In one aspect LED based illumination module 100 includes a transmissive color converting element 133 that includes an optically transparent layer 134 and semi-transparent color converting layer 135 fixed to the optically transparent layer 134. In another aspect, LED based illumination module 100 includes a reflective color converting element 130 that includes a reflective layer 131 and color converting layer 132 fixed to reflective layer 131. In yet another aspect, LED based illumination module 100 includes a reflective color converting element 129 that includes a reflective layer 128 and color converting layer 127 fixed to reflective layer 128. In one embodiment, transmissive color converting element 133 is output window 108 and reflective color converting element 130 is sidewall insert 107. In addition, in one embodiment, reflective color converting element 129 is bottom reflector insert 106. LEDs 102 emit blue photons that interact with color converting elements 129, 130, and 133.

Transmissive color converting element 133 provides highly efficient color conversion in a transmissive mode. Color converting layer 135 includes a sparse, thin layer of phosphor applied in accordance with method 160. Transmission of unconverted light is not desirable in lighting devices pumped with UV or sub-UV radiation because of the health risk to humans exposed to radiation at these wavelengths. However, for an LED based illumination module pumped by LEDs with emission wavelengths above UV, it is desirable for a significant percentage of unconverted light (e.g., blue light emitted from LEDs 102) to pass through light mixing cavity 109 and through output window 108 (e.g., transmissive color converting element 133) without color conversion. This promotes high efficiency because losses inherent to the color conversion process are avoided. Sparsely packed, thin layers of phosphor are suitable to color convert a portion of incident light. For example, it is desirable to allow at least ten percent of incident light to be transmitted through the color converting layer 135 without conversion. In particular, a color converting layer that is less than three times an average diameter of the phosphor particles with a packing density of phosphor particles in the polymer matrix of greater than 80% has been found to perform advantageously.

In one embodiment, color converting layer 132 is deposited on reflective layer 131 with a thickness that is two times the average diameter of the phosphor particles with a packing density greater than 90%. In this embodiment, the average phosphor particle diameter is between six and eight microns.

To deposit color converting layer 132 on reflective layer 131, 50 to 100 grams of either one of or a combination of ethyl cellulose and polyvinyl butyral binder is mixed with 200 to 600 grams of suitable solvent such as terpineol, isobutyl alcohol, butyl carbolite acetate, or butyl cellulose. The mixture is rolled in a jar by a slow moving roller for 2 to 4 days until a clear binder paste is formed. The viscosity of the binder paste varies with the solvent content. In a separate mixture, 10 to 30 grams of a surfactant such as stearic acid or polyethylene glycol is mixed in 50 to 100 grams of solvent to form a surfactant paste. In a final mixture, 1 to 5 grams of red emitting phosphor particles is mixed with 1 to 10 grams of the binder paste, 0.1 to 0.5 grams of the surfactant paste and 2 to 10 drops of plasticizer in a 3D Mixer (THINKY ARE-250) for 2 to 10 minutes to generate a homogeneous suspension of phosphor particles. Depending on the application, the ratio of binder, surfactant, plasticizer and phosphor is tuned.

In a more specific example, 10 grams of ethyl cellulose binder is mixed with 80 grams of butyl carbolite acetate (BAC) solvent in a glass jar. The mixture is stirred for a few hours in a glass jar and then rolled in a slow moving roller for 2 to 4 days until a clear binder paste is formed. In a separate mixture, 10 grams of polyethylene glycol surfactant is mixed in 100 grams of BAC until an optically clear surfactant paste is formed. One gram of red emitting phosphor $\{(Sr,Ca)AlSiN_3:Eu\}$ of 10 micron average particle size is mixed with 1 gram of binder paste, 0.1 grams of surfactant paste and 2 drops of plasticizer in a 3D Mixer (THINKY ARE-250) for 2 minutes.

Color converting layer 132 may be deposited onto reflective layer 131 by blade coating. An automatic film applicator (Elcometer 4340) is used with pre-cut stainless steel stencils to determine the coverage area. While holding the reflective layer 131 with a stencil under vacuum on an aluminum base, the homogeneous suspension of phosphor particles is dispersed using a slow moving (e.g., 5 to 60 mm/sec) sapphire or stainless steel blade. After coating, reflective color converting element 130 is transferred into an oven and heated at 80 to 150 degrees Centigrade for 1 to 5 hours in open atmosphere to form the cured color converting layer 132.

Color converting layer 132 may be deposited onto reflective layer 131 by screen printing. Screens with mesh numbers from 150 to 300 are used. The screens are either open completely or masked with various sizes and shapes of different aspect ratios. Using the aforementioned automatic film applicator, reflective layer 131 with required screen are attached to an aluminum base under vacuum and the homogeneous suspension of phosphor particles is dispersed using a suitable squeeze under constant pressure and speed (e.g., 5 to 100 mm/sec). After screen printing, reflective color converting element 130 is transferred into an oven and heated at 80 to 150 degrees Centigrade for 1 to 5 hours in open atmosphere to form the cured color converting layer 132.

After heat treatment, the cured color converting layer 132 is employed in an LED based illumination module to generate white light with a CCT between 2,000 degrees Kelvin to 6,000 degrees Kelvin.

Figure 9:
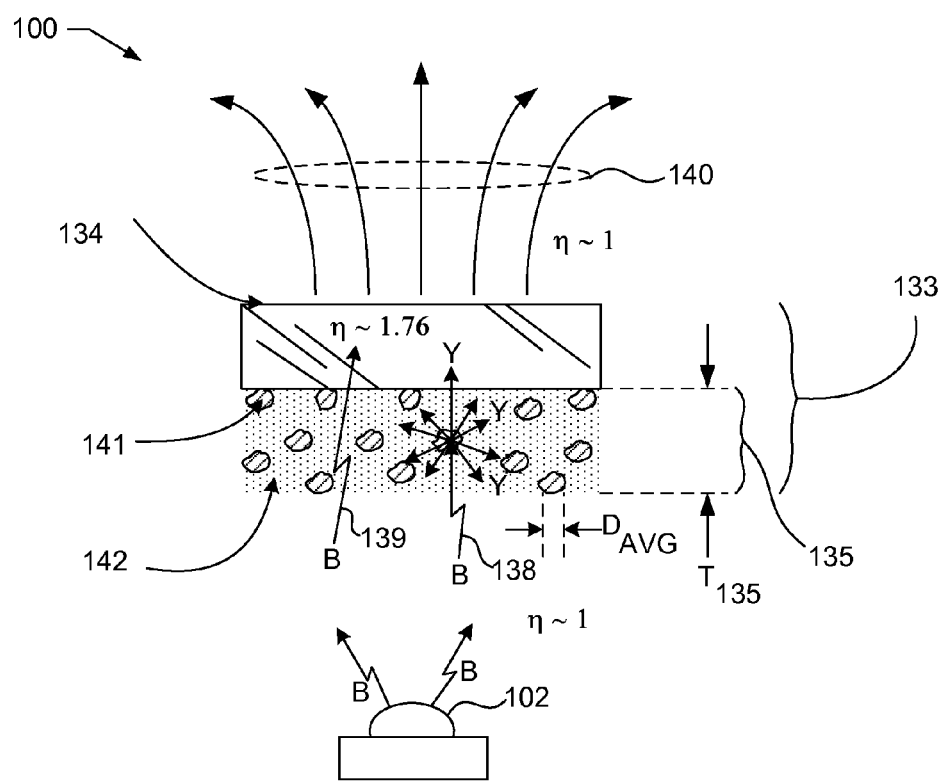
FIG. 9 illustrates a cross-sectional view of a portion of LED illumination module with the transmissive color converting element having a color converting layer with a thickness less than five times the average diameter of phosphor particles.

FIG. 9 illustrates a cross-sectional view of a portion of the LED illumination module 100 focusing on the interaction of photons emitted by LED 102 with transmissive color converting element 133. Transmissive color converting element 133 includes transmissive layer 134 and semi-transparent color converting layer 135. Transmissive layer 134 may be constructed from an optically clear medium (e.g., glass, sapphire, polycarbonate, plastic). Transmissive color converting element 133 may include additional layers (not shown) to enhance optical system performance. In one example, transmissive color converting element 133 may include optical films such as a dichromic filter, a low index coating, additional layers such as a layer of scattering particles, or additional color converting layers including phosphor particles. Semi-transparent, color converting layer 135 includes phosphor particles 141 embedded in a polymer binder 142.

In one embodiment, semi-transparent color converting layer 135 is deposited on optically transparent layer 134 with a thickness $T_{135}$ that is three times the average diameter of the phosphor particles 141 with a packing density greater than 80%. The average diameter of phosphor particles 141 may be between one micrometer and twenty five micrometers. In some embodiments, phosphor particles 141 average five to ten micrometers in diameter. Phosphor particles 141 are arranged to enable a portion of light to be transmitted through transmissive color converting element 133 without color conversion. In this embodiment, the average phosphor particle diameter $D_{AVG}$ is ten microns. To deposit semi-transparent color converting layer 135 on optically transparent layer 134, 10 grams of ethyl cellulose binder is mixed 80 grams of butyl carbolite acetate (BAC) solvent in a glass jar and stirred for few hours in a glass jar of wide mouth and then rolled in slow moving roller for 2 to 4 days until a clear binder paste is formed. In a separate mixture, 10 grams of polyethylene glycol surfactant is mixed in 100 grams of BAC until an optically clear surfactant paste is formed. In a final mixture, one gram of yellow emitting phosphor such as YAG:Ce of 10 micron average particle size is mixed with 1.2 grams of binder paste, 0.1 grams of surfactant paste, and 2 drops of plasticizer in a 3D Mixer (THINKY ARE-250) for 2 minutes.

Semi-transparent color converting layer 135 may be deposited onto optically transparent layer 134 by blade coating. An automatic film applicator (Elcometer 4340) is used with pre-cut stainless steel stencils to determine the coverage area. While holding the optically transparent layer 134 with a stencil under vacuum on an aluminum base, the homogeneous suspension of phosphor particles is dispersed using a slow moving (e.g., 10 mm/sec) sapphire or stainless steel blade.

Semi-transparent color converting layer 135 may be deposited onto optically transparent layer 134 by screen printing. Screens with mesh numbers from 150 to 300 are used. The screens are either open completely or masked with various sizes and shapes of different aspect ratios. Using the aforementioned automatic film applicator, optically transparent layer 134 with required screen are attached to an aluminum base under vacuum and the homogeneous suspension of phosphor particles is dispersed using a suitable squeeze under constant pressure and speed (e.g., 20 mm/sec).

Semi-transparent color converting layer 135 may be deposited onto optically transparent layer 134 by spray painting. A low viscosity slurry is prepared by mixing 1 gram of yellow emitting phosphor such as YAG:Ce 1.2 gram of the binder paste, 0.1 gram of the surfactant paste, 2 drops of plasticizer and ten grams of BAC. A manual spray gun of 50 cc capacity at 10 P.S.I with fine tip has been used with satisfactory results.

After coating, transmissive color converting element 133 is transferred into an oven and heated to 120 degrees Centigrade for 1 hour in open atmosphere to form the cured semi-transparent color converting layer 135.

After heat treatment, the cured semi-transparent color converting layer 135 is employed in an LED based illumination module to generate white light with a CCT between 2,000 degrees Kelvin to 6,000 degrees Kelvin.

As depicted in FIG. 9, blue photon 139 emitted from LED 102 passes through transmissive color converting element 133 without color conversion and contributes to combined light 140 as a blue photon. However, blue photon 138 emitted from LED 102 is absorbed by a phosphor particle embedded in color converting layer 135. In response to the stimulus provided by blue photon 138, the phosphor particle emits a light of a longer wavelength in an isotropic emission pattern. In the illustrated example, the phosphor particle emits yellow light. As illustrated in FIG. 9, a portion of the yellow emission passes through transmissive color converting element 133 and contributes to combined light 140 as a yellow photon. Another portion of the yellow emission is absorbed by adjacent phosphor particles and is either reemitted or lost. Yet another portion of the yellow emission is scattered back into light mixing cavity 109 where it is either reflected back toward transmissive color converting element 133 or is absorbed and lost within light mixing cavity 109.

Figure 10:
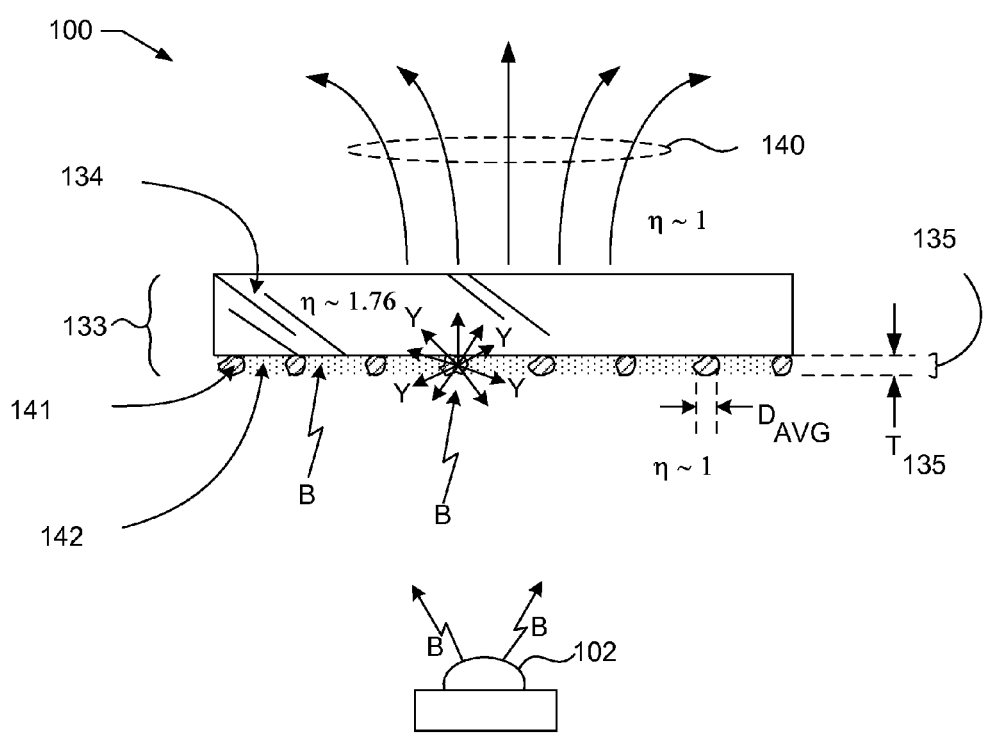
FIG. 10 illustrates a cross-sectional view of a portion of LED illumination module with the transmissive color converting element having a color converting layer with a single layer of phosphor particles.

FIG. 10 illustrates a cross-sectional view of a portion of LED illumination module 100 with the transmissive color converting element 133 having a color converting layer 135 with a single layer of phosphor particles 141. In one embodiment, phosphor particles 141 may be spaced apart by polymer binder 142. In another embodiment, phosphor particles 141 may be deposited on transmissive layer 134 and the polymer binder 142 removed as described in this patent document. In either embodiment, the layer thickness $T_{135}$ is so small that reabsorbtion of converted light by neighboring phosphor particles is minimized. In addition, Fresnel losses associated with light transmission through color converting layer 135 are minimized. Furthermore, losses due to total internal reflection (TIR) within color converting layer 135 are minimized. As such, phosphor particles fixed to transmissive layer 134 in a monolayer have been found to transmit unconverted light and converted light in an efficient manner.

For an LED based illumination module, it is desirable to convert a portion of light emitted from the LEDs (e.g., blue light emitted from LEDs 102) to longer wavelength light in light mixing cavity 109 while minimizing photon loses. Densely packed, thin layers of phosphor are suitable to efficiently color convert a significant portion of incident light while minimizing loses associated with reabsorption by adjacent phosphor particles, total internal reflection (TIR), and Fresnel effects.

Figure 11:
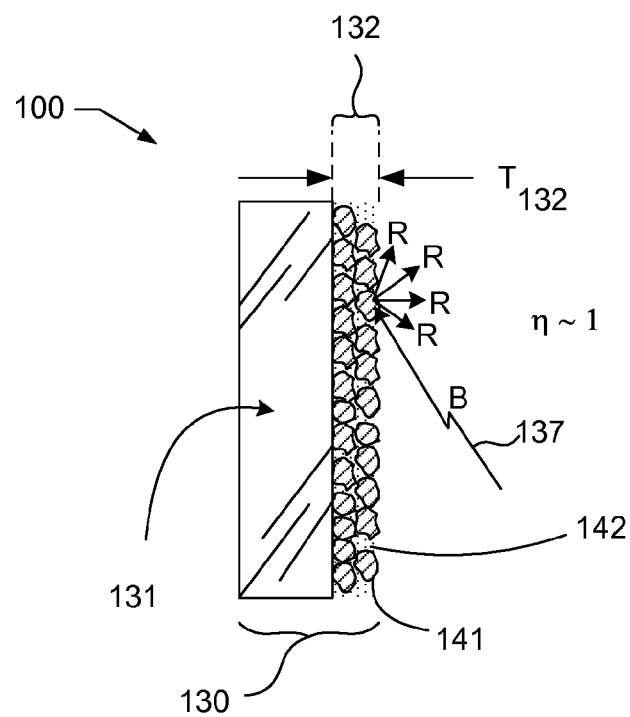
FIG. 11 illustrates a cross-sectional view of a portion of the LED illumination module with the reflective color converting element having a color converting layer with a thickness less than five times the average diameter of phosphor particles.

FIG. 11 illustrates a cross-sectional view of a portion of the LED illumination module 100 with the reflective color converting element 130 having a color converting layer 132 with a thickness less than five times the average diameter of phosphor particles 141. The average diameter of phosphor particles 141 may be between one micrometer and twenty five micrometers. In some embodiments, the average diameter of phosphor particles 141 is between five and ten micrometers. Phosphor particles 141 are arranged with a packing density of more than 80% to increase the probability that an incoming photon of light will interact with a phosphor particle to generate converted light. For example, blue photon 137 emitted from LED 102 is incident to reflective color converting element 130 and is absorbed by a phosphor particle of color converting layer 132. In response to the stimulus provided by blue photon 137, the phosphor particle emits a light of a longer wavelength in an isotropic emission pattern. In the illustrated example, the phosphor particle emits red light. As illustrated in FIG. 11, a portion of the red emission enters light mixing cavity 109. Another portion of the red emission is absorbed by adjacent phosphor particles and is either reemitted or lost. Yet another portion of the red emission is reflected off of reflective layer 131 and is either transmitted through color converting layer 132 to light mixing cavity 109 or is absorbed by an adjacent phosphor particle and is either reemitted or lost.

Figure 12:
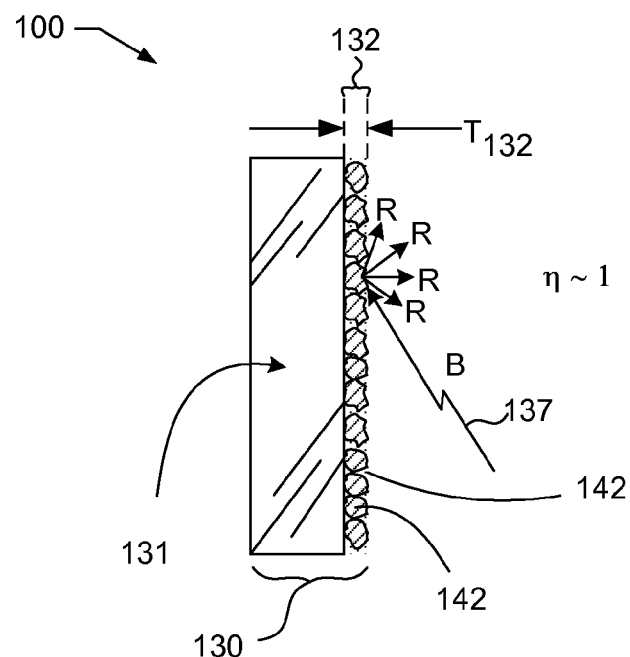
FIG. 12 illustrates a cross-sectional view of a portion of the LED illumination module with the reflective color converting element having a color converting layer with a single layer of phosphor particles.

FIG. 12 illustrates a cross-sectional view of a portion of the LED illumination module 100 with the reflective color converting element 130 having a color converting layer 132 with a single layer of phosphor particles 141. In one embodiment, phosphor particles 141 may be spaced apart by polymer binder 142, for example, as described in method 150. In another embodiment, phosphor particles 141 may be deposited on reflective layer 131 and the polymer binder 142 removed as discussed in this patent document. In either embodiment, the layer thickness is so small that reabsorbtion of converted light by neighboring phosphor particles is minimized. In addition, Fresnel losses associated with light transmission through color converting layer 132 are minimized. Furthermore, losses due to total internal reflection (TIR) within color converting layer 132 are minimized. As such, phosphor particles fixed to reflective layer 131 in a monolayer have been found to efficiently convert light.

Figure 13:
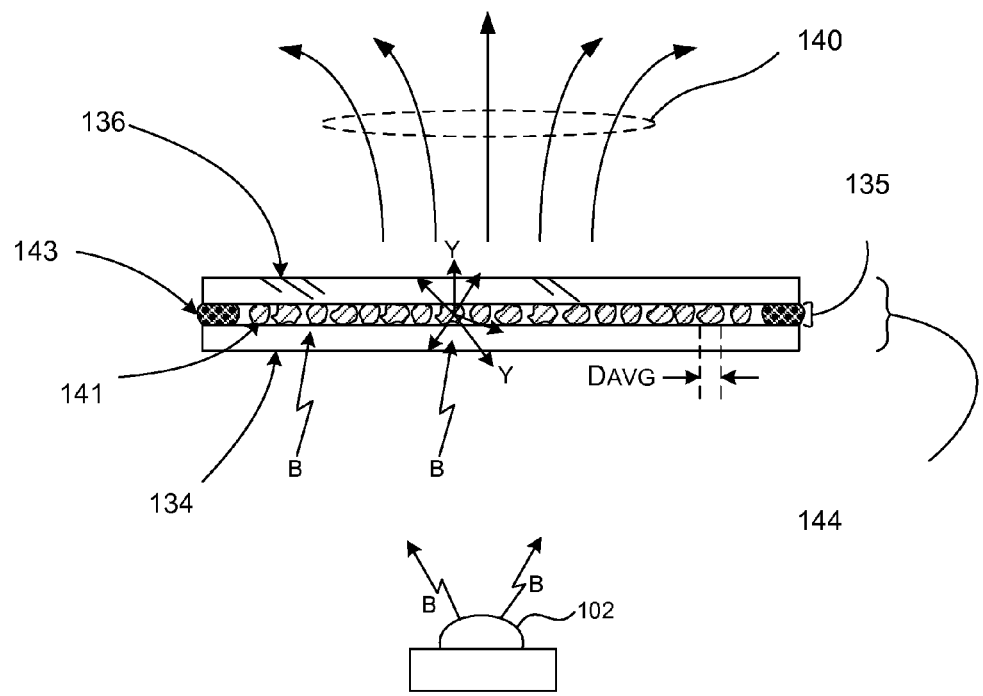
FIG. 13 illustrates a cross-sectional view of LED illumination module with a transmissive color converting assembly.

FIG. 13 illustrates a cross-sectional view of LED illumination module 100 with a transmissive color converting assembly 144. In the depicted embodiment, transmissive color converting assembly 144 includes a color converting layer 135 with a single layer of phosphor particles 141. Phosphor particles 141 may be deposited on transmissive layer 134 and the polymer binder 142 removed as described in this patent document. The color converting layer 135 is enclosed by a second transmissive layer 136 that is sealed to transmissive layer 134 by seal element 143. In this manner color converting layer 135 is isolated from the environment. In some embodiments, seal element 143 may be a frit seal glass such as Pb free Bi based glass powder (BSF-1307). In some other embodiments, seal element 143 may be an optical adhesive (e.g., adhesive Type J-91 Lens Bond/optical cement).

Figure 14:
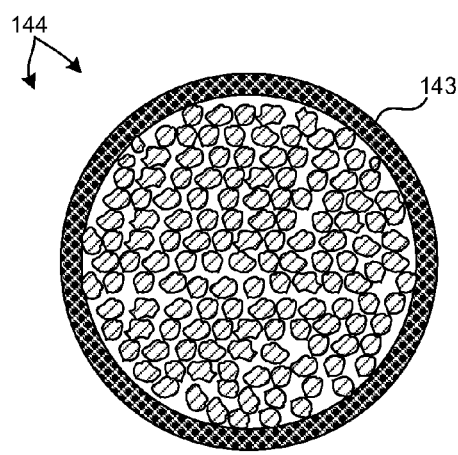
FIG. 14 is illustrative of a top view of transmissive color converting assembly shown in FIG. 13.

FIG. 14 is illustrative of a top view of transmissive color converting assembly 144. In particular, seal element 143 is illustrated. Seal element 143 extends along the perimeter of assembly 144. In this manner, light emitted from LED based illumination device 100 is minimally impacted by the presence of sealing element 143. By isolating color converting layer 135 from the environment, phosphors may be successfully employed that are typically sensitive to environmental factors such as humidity. Also, by minimizing the presence of binders in color converting layer 135, transmissive color converting assembly 144 may be operated at higher temperatures without suffering degradation of optical performance.

Figure 15:
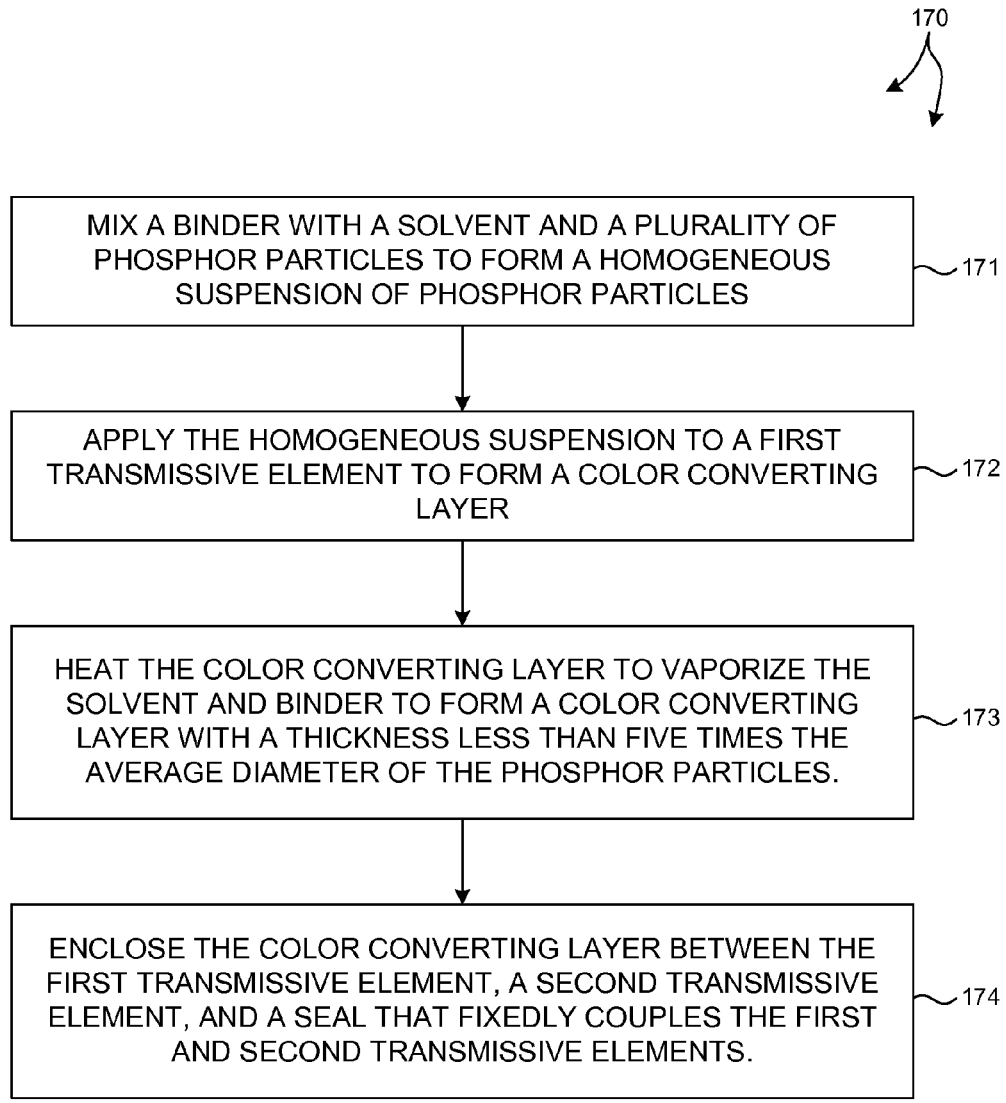
FIG. 15 is a flow chart illustrative of a method of enclosing a thin, semi-transparent color converting layer between two transparent substrates and sealing the color converting layer from the environment.

FIG. 15 is a flow chart illustrative of a method 170 of enclosing a thin, semi-transparent color converting layer between two transparent substrates (e.g., sapphire, alumina, glass, polycarbonate, plastic) and sealing the color converting layer from the environment. In one aspect, the color converting layer does not include binders or solvents. In this manner, as the phosphors are heated during operation, there is no impact on light performance due to binder degradation. In another aspect, separating the color converting layer from the environment permits a broad range of environmentally sensitive phosphors to be used as an element of LED based illumination module 100.

In block 171, a polymer binder (e.g., ethylcellulose) is mixed with a solvent (e.g., butoxyethyl acetate) and combined with phosphor particles to form a homogeneous phosphor suspension. Different polymer binders may be employed as part of method 160 (e.g., polyvinyl butyral, cellulose based binders, silicone based binders, and urethane based binders). Similarly, solvents selected for their compatibility with the selected binders (e.g., terpineol, isobutyl alcohol, butyl carbolite acetate, butyl cellulose, silicone solvents, and urethane solvents) may be employed as part of method 170. In some embodiments, in addition to the phosphor particles, a plasticizer (e.g., diisobutyl phthalate) may be added to facilitate adhesion of the phosphor particles to the substrate. In some embodiments, a surfactant (e.g., stearic acid, PEG) may be added. The surfactant acts to keep the phosphor particles from clumping together and promotes the even distribution of phosphor particles in the suspension.

In different examples, the proportion of phosphor particles to reduced polymer binder may vary. In one example, phosphor particles may be mixed with the reduced polymer binder in a 95:5 proportion by weight. This proportion has been found useful to generate color converting layers with a packing density less than 0.95 with a thickness less than three times the average diameter of the phosphor particles to produce a semi-transparent color converting layer where at least 10% of incident light is transmitted through the layer without color conversion.

In block 172, the homogeneous phosphor suspension is applied to a transparent substrate to form an uncured, semi-transparent color converting layer as discussed with respect to method 155. The homogeneous phosphor suspension may be applied to the transparent substrate by a number of methods. Examples of suitable methods include blade coating, screen printing, and spraying. The solvent may be mixed with the polymer binder in differing proportions depending on the desired viscosity. For example, for effective application to a substrate by blade coating or screen printing, solvent may be mixed with the polymer binder in a suitable proportion (e.g., between 5:1 and 10:1 by weight). For effective application to a substrate by spraying, solvent may be mixed with the polymer binder in a suitable proportion (e.g., between 10:1 and 20:1 by weight).

In block 173, the uncured, semi-transparent color converting layer is heated to a temperature sufficient to vaporize the solvent and denature the binders to form a semi-transparent color converting layer with a thickness of less than five times the average diameter of the phosphor particles.

The process temperature is held above the temperature where the binder begins to decompose. In one example, the uncured, semi-transparent color converting layer is heated to a temperature of 300 to 350 degrees Centigrade for 20 to 30 minutes. In this manner, the semi-transparent color converting layer is predominately comprised of phosphor particles with only trace elements of binder material remaining.

In block 174, the color converting layer is enclosed between the first transmissive element and a second transmissive element (e.g., between two sheets of glass). A sealing element fixedly couples the two transmissive elements and encloses the color converting layer between the two transmissive elements. In this manner, the color converting element is isolated from the environment.

Phosphor particles of varying diameter may be effectively employed using method 170. The inventors have found the use of phosphor particles with an average diameter of 6-8 μm to be useful. However, phosphor particles with an average diameter between 1 μm and 25 μm may also be used beneficially.

Figure 16:
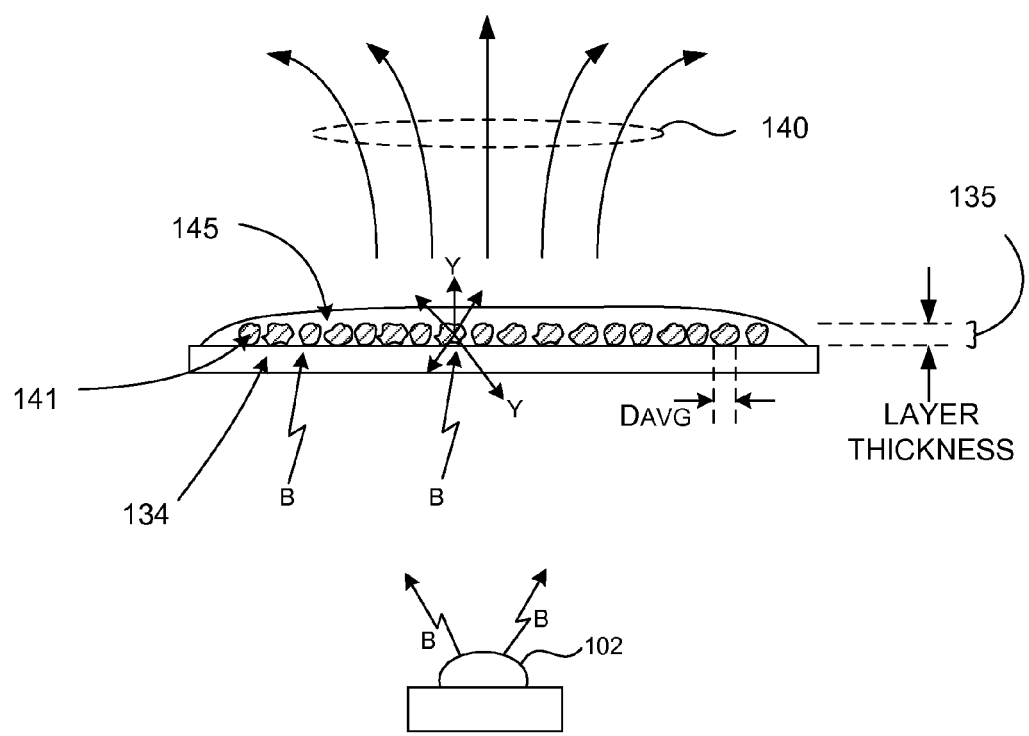
FIG. 16 illustrates a cross-sectional view of LED illumination module with a color converting layer disposed on transmissive layer and encapsulated with a seal element.

FIG. 16 illustrates a cross-sectional view of LED illumination module 100 with a color converting layer 135 disposed on transmissive layer 134 and encapsulated with a seal element 145. In the depicted embodiment, transmissive color converting assembly 144 includes a color converting layer 135 with a single layer of phosphor particles 141. Phosphor particles 141 may be deposited on transmissive layer 134 and the polymer binder 142 removed as described in this patent document. The color converting layer 135 is encapsulated by seal element 145. In this manner color converting layer 135 is isolated from the environment. In some embodiments, seal element 145 may be a metal silicate such as sodium silicate or any organic metallic silicate such as tetraethoxysilane. In some other embodiments, seal element 145 may be an optical adhesive (e.g., adhesive Type J-91 Lens Bond/Optical cement). By isolating color converting layer 135 from the environment, phosphors may be successfully employed that are typically sensitive to environmental factors such as humidity. Also, by minimizing the presence of binders in color converting layer 135, color converting layer 135 may be operated at higher temperatures without suffering degradation of optical performance.

Figure 17:
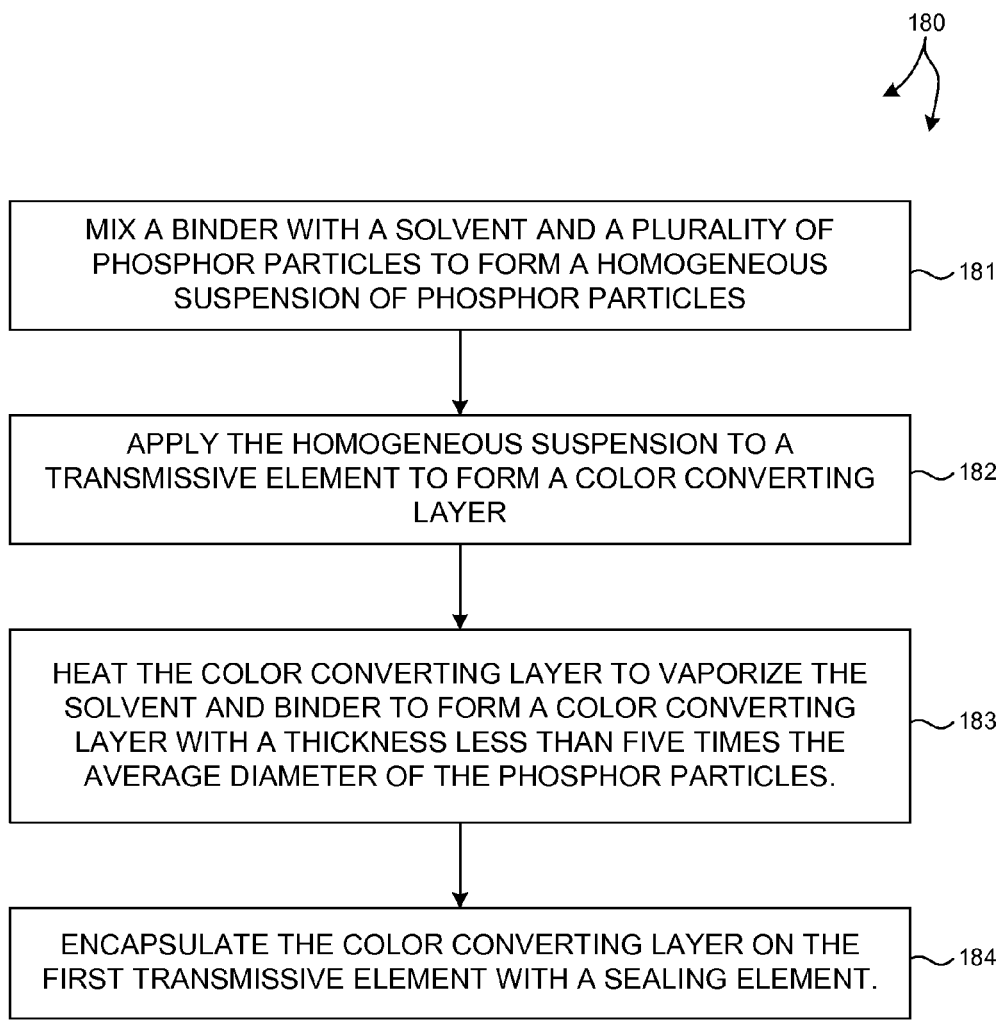
FIG. 17 is a flow chart illustrative of a method of encapsulating a thin, semi-transparent color converting layer on a transmissive substrate and sealing the color converting layer from the environment.

FIG. 17 is a flow chart illustrative of a method 180 of encapsulating a thin, semi-transparent color converting layer on a transmissive substrate (e.g., sapphire, alumina, glass, polycarbonate, plastic) and sealing the color converting layer from the environment. In one aspect, the color converting layer does not include binders or solvents. In this manner, as the phosphors are heated during operation, there is no impact on light performance due to binder degradation. In another aspect, separating the color converting layer from the environment permits a broad range of environmentally sensitive phosphors to be used as an element of LED based illumination module 100.

In block 181, a polymer binder (e.g., ethylcellulose) is mixed with a solvent (e.g., butoxyethyl acetate) and combined with phosphor particles to form a homogeneous phosphor suspension as discussed hereinbefore with respect to methods 155, 160, and 170.

In block 182, the homogeneous phosphor suspension is applied to a transparent substrate to form an uncured, semi-transparent color converting layer as discussed with respect to method 155.

In block 183, the uncured, semi-transparent color converting layer is heated to a temperature sufficient to vaporize the solvent and denature the binders to form a semi-transparent color converting layer with a thickness of less than five times the average diameter of the phosphor particles.

The process temperature is held above the temperature where the binder begins to decompose. In one example, the uncured, semi-transparent color converting layer is heated to a temperature of 300 to 350 degrees Centigrade for 10 to 30 minutes. In this manner, the semi-transparent color converting layer is predominately comprised of phosphor particles with only trace elements of binder material remaining.

In block 184, the color converting layer is encapsulated by a sealing element. The sealing element isolates the color converting layer 135 from the environment.

Phosphor particles of varying diameter may be effectively employed using method 180. The inventors have found the use of phosphor particles with an average diameter of 6-8 μm to be useful. However, phosphor particles with an average diameter between 1 μm and 25 μm may also be used beneficially.

Figure 18:
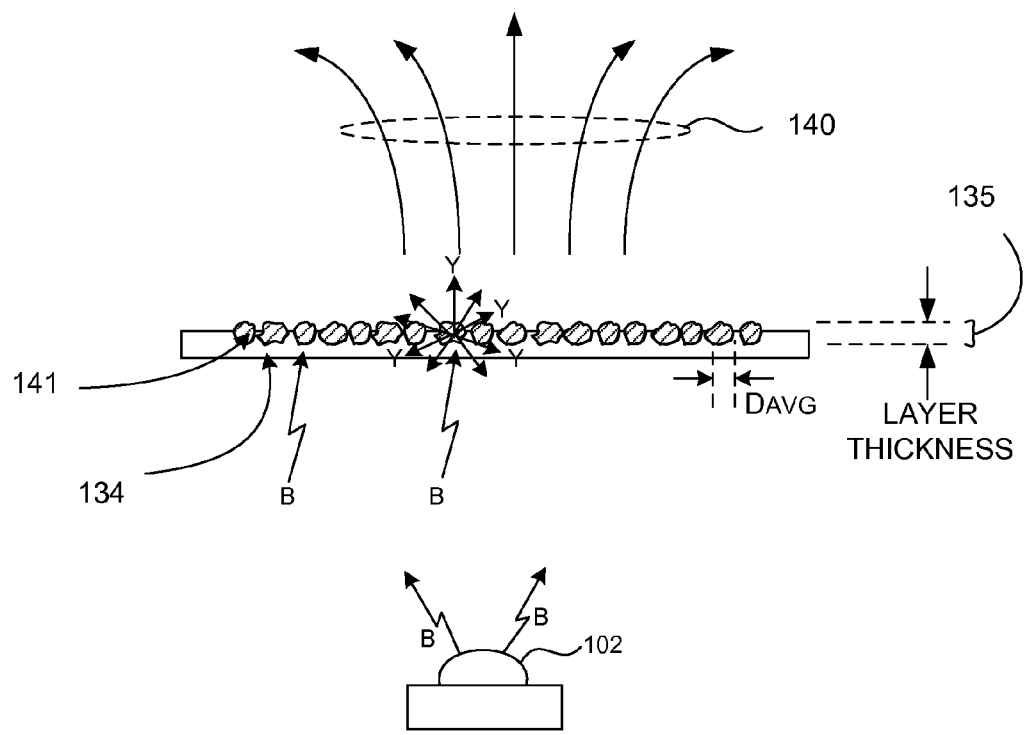
FIG. 18 illustrates a cross-sectional view of LED illumination module with a color converting layer embedded in the surface of transmissive layer.

FIG. 18 illustrates a cross-sectional view of LED illumination module 100 with a color converting layer 135 embedded in the surface of transmissive layer 134. In the depicted embodiment, a color converting layer 135 with a single layer of phosphor particles 141 is embedded in the surface of a transmissive layer 134. In one embodiment, transmissive layer 134 is low softening glass such as float glass. Phosphor particles 141 may be deposited on transmissive layer 134 and the polymer binder 142 removed as described in this patent document. Transmissive layer 134 is heated to its glass softening temperature and phosphor particles 141 are embedded into the surface of the glass. In some examples pressure is applied to facilitate embedding the phosphor particles into the surface of the glass. Transmissive layer 134 is cooled slowly to relieve internal stress. In this manner, phosphor particles 141 are fixed to transmissive layer 134 without binders. In this manner, color converting layer 135 may operate at higher temperatures without impacting optical performance. In some embodiments, the color converting layer 135 is subsequently encapsulated by seal element 145. In this manner color converting layer 135 is isolated from the environment.

Figure 19:
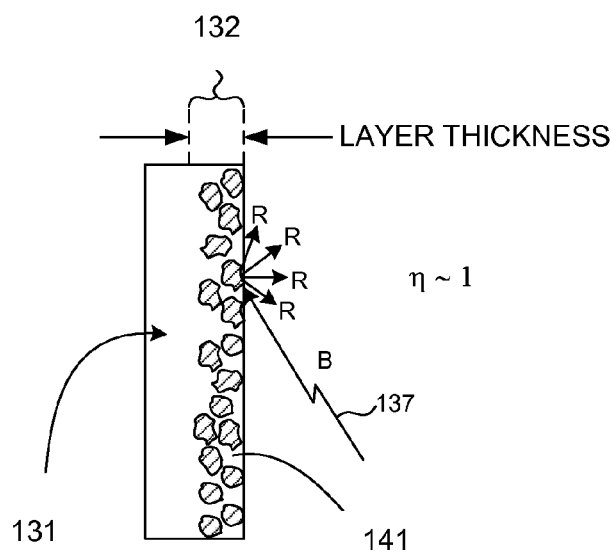
FIG. 19 illustrates a reflective layer of PTFE material.

FIG. 19 illustrates a reflective layer 131 of PTFE material. As depicted, phosphor particles 141 are embedded in the PTFE reflective layer 131. In some embodiments, phosphor particles 141 are mixed with PTFE granules, and subsequently sintered together to achieve the desired optical structure that includes phosphor particles 141. Reflective layer 131 may be subdivided into multiple layers. For example, reflective layer 131 may include a reflective layer embedded with phosphor particles 141 backed by another reflective layer that does not include phosphor particles 141.

Although certain specific embodiments are described above for instructional purposes, the teachings of this patent document have general applicability and are not limited to the specific embodiments described above. For example, any of sidewall insert 107, bottom reflector insert 106, and output window 108 may be patterned with phosphor. Both the pattern itself and the phosphor composition may vary. In one embodiment, the illumination device may include different types of phosphors that are located at different areas of the light mixing cavity 109. For example, a red phosphor may be located on either or both of the insert 107 and the bottom reflector insert 106 and yellow and green phosphors may be located on the top or bottom surfaces of the window 108 or embedded within the window 108. In one embodiment, a central reflector may have patterns of different types of phosphor, e.g., a red phosphor on a first area and a green phosphor on a separate second area. In another embodiment, different types of phosphors, e.g., red and green, may be located on different areas on the insert 107. For example, one type of phosphor may be patterned on the sidewall insert 107 at a first area, e.g., in stripes, spots, dots, or other patterns, while another type of phosphor is located on a different second area of the insert 107. If desired, additional phosphors may be used and located in different areas in the cavity 109. Additionally, if desired, only a single type of wavelength converting material may be used and patterned in the cavity 109, e.g., on the sidewalls. In another example, FIGS. 4A and 4B illustrate the side walls as having a linear configuration, but it should understood that the sidewalls may have any desired configuration, e.g., curved, non-vertical, beveled etc. For example, a higher transfer efficiency is achieved through the light mixing cavity 109 by pre-collimation of the light using tapered side walls. In another example, cavity body 105 is used to clamp mounting board 104 directly to mounting base 101 without the use of mounting board retaining ring 103. In other examples mounting base 101 and heat sink 130 may be a single component. In another example, LED based illumination module 100 is depicted in FIGS. 1, 2, and 3 as a part of a luminaire 150. As illustrated in FIG. 3, LED based illumination module 100 may be a part of a replacement lamp or retrofit lamp. But, in another embodiment, LED based illumination module 100 may be shaped as a replacement lamp or retrofit lamp and be considered as such. Accordingly, various modifications, adaptations, and combinations of various features of the described embodiments can be practiced without departing from the scope of the invention as set forth in the claims.

What is claimed is:

1. A method comprising:
mixing a polymer binder with a solvent and a plurality of phosphor particles to form a homogeneous suspension of the phosphor particles;
applying the homogeneous suspension to a surface of a transparent substrate to form an uncured color converting layer; and
heating the uncured color converting layer to vaporize the solvent to form a cured color converting layer, wherein the cured color converting layer includes the phosphor particles suspended in the polymer binder, and wherein a thickness of the cured color converting layer on the transparent substrate is less than five times an average diameter of the phosphor particles.

2. The method of claim 1, further comprising:
enclosing the color converting layer between the first transmissive element and a second transmissive element with a seal that fixedly couples the first and second transmissive elements.

3. The method of claim 1, further comprising:
encapsulating the color converting layer on the first transmissive element with a sealing element.

4. The method of claim 1, wherein the heating involves heating the uncured color converting layer to no more than three hundred degrees Centigrade.

5. The method of claim 1, wherein the polymer binder is taken from the group consisting of: an ethyl cellulose and a polyvinyl butyral.

6. The method of claim 1, wherein the solvent is taken from the group consisting of: a butyl carbolite acetate and a terpineol.

7. The method of claim 1, wherein the thickness of the cured color converting layer is a monolayer of the phosphor particles.

8. The method of claim 7, wherein a packing density of the cured color converting layer is less than 0.95.

9. The method of claim 8, wherein at least ten percent of a light incident to the optically transparent substrate is transmitted without color conversion.

10. A method comprising:
mixing a polymer binder with a solvent and a plurality of phosphor particles to form a homogeneous suspension of the phosphor particles;
applying the homogeneous suspension to a surface of a polytetrafluoroethylene (PTFE) material to form an uncured color converting layer; and
heating the uncured color converting layer to vaporize the solvent to form a cured color converting layer, wherein the cured color converting layer includes the phosphor particles suspended in the polymer binder, and wherein a thickness of the cured color converting layer on the PTFE material is less than five times an average diameter of the phosphor particles.

11. The method of claim 10, wherein the heating involves heating the uncured color converting layer to no more than three hundred degrees Centigrade.

12. The method of claim 10, wherein a packing density of the cured color converting material is greater than 0.5.

13. The method of claim 10, wherein an average diameter of the phosphor particles is between five and twenty microns.

14. The method of claim 10, wherein the surface is an interior surface of an LED based illumination module.

15. An apparatus comprising:
a light source sub-assembly having a plurality of Light Emitting Diodes (LEDs); and
a transmissive color converting element comprising an optically transparent layer and a first color converting layer fixed to the optically transparent layer, wherein the first color converting layer includes a plurality of phosphor particles of a first type embedded in a polymer matrix, wherein the thickness of the first color converting layer is less than three times an average diameter of the phosphor particles.

16. The apparatus of claim 15, further comprising:
a reflective color converting element comprising a polytetrafluoroethylene (PTFE) layer and a second color converting layer fixed to the PTFE layer, wherein the second color converting layer includes a plurality of phosphor particles of a second type embedded in a polymer matrix, and wherein a thickness of the second color converting layer is less than five times an average diameter of the phosphor particles of the second type.

17. The apparatus of claim 15, wherein the phosphor particles of the first type have a peak emission wavelength of no more than 600 nanometers.

18. The apparatus of claim 15, wherein a light transmitted through the first color converting layer has a correlated color temperature less than 3,100 degrees Kelvin.

19. The apparatus of claim 15, wherein a packing density of the first color converting layer is less than 0.95.

20. The apparatus of claim 16, wherein a packing density of the second color converting layer is greater than 0.5.

* * * * *